US010871568B2

(12) United States Patent
Mase et al.

(10) Patent No.: US 10,871,568 B2
(45) Date of Patent: Dec. 22, 2020

(54) DISTANCE MEASUREMENT DEVICE

(71) Applicant: HAMAMATSU PHOTONICS K.K., Hamamatsu (JP)

(72) Inventors: Mitsuhito Mase, Hamamatsu (JP); Jun Hiramitsu, Hamamatsu (JP); Akihiro Shimada, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 356 days.

(21) Appl. No.: 15/567,645

(22) PCT Filed: Apr. 8, 2016

(86) PCT No.: PCT/JP2016/061535
§ 371 (c)(1),
(2) Date: Oct. 19, 2017

(87) PCT Pub. No.: WO2016/175012
PCT Pub. Date: Nov. 3, 2016

(65) Prior Publication Data
US 2018/0106902 A1 Apr. 19, 2018

(30) Foreign Application Priority Data
Apr. 28, 2015 (JP) ................................ 2015-091372

(51) Int. Cl.
*G01S 17/10* (2020.01)
*G01S 7/486* (2020.01)
(Continued)

(52) U.S. Cl.
CPC ............. *G01S 17/10* (2013.01); *G01S 7/486* (2013.01); *G01S 7/4861* (2013.01); *G01S 7/4865* (2013.01)

(58) Field of Classification Search
None
See application file for complete search history.

(56) References Cited

U.S. PATENT DOCUMENTS

2009/0185159 A1* 7/2009 Rohner .................. G01S 7/487
356/5.01
2011/0304842 A1* 12/2011 Kao ........................ G01S 17/89
356/5.01
(Continued)

FOREIGN PATENT DOCUMENTS

CN 103140735 A 6/2013
CN 103155150 A 6/2013
(Continued)

OTHER PUBLICATIONS

International Preliminary Report on Patentability dated Nov. 9, 2017 for PCT/JP2016/061535.

*Primary Examiner* — Isam A Alsomiri
*Assistant Examiner* — Amir J Askarian
(74) *Attorney, Agent, or Firm* — Faegre Drinker Biddle & Reath LLP

(57) ABSTRACT

The processing unit causes a light source unit to emit modulated light in one or more emission periods in a plurality of charge transfer cycles within a frame period from connection of an accumulating region to a reset potential to next connection of the accumulating region to the reset potential by controlling a reset switch, and increases the number of emission periods per charge transfer cycle within one frame period. The processing unit obtains, from a sensor unit, a plurality of read values corresponding to a charge amount accumulated in the accumulating region at an alternate point with the plurality of charge transfer cycles, in each of a plurality of read cycles corresponding to each of the plurality of charge transfer cycles. The processing unit calculates the distance based on the plurality of obtained read values.

8 Claims, 16 Drawing Sheets

(51) Int. Cl.
    *G01S 7/4861*   (2020.01)
    *G01S 7/4865*   (2020.01)

(56)           References Cited

U.S. PATENT DOCUMENTS

2012/0075534 A1\*   3/2012   Katz ................... H04N 9/3182
                                                        348/602
2013/0148097 A1     6/2013   Shin et al.
2014/0103196 A1\*   4/2014   Soga .................... G01S 7/4865
                                                        250/208.2
2014/0125766 A1\*   5/2014   Cohen ................... G01S 17/89
                                                        348/46
2014/0327903 A1\*  11/2014   Mase ................... G01S 7/4861
                                                        356/5.05
2015/0226853 A1\*   8/2015   Seo ........................ G01S 17/89
                                                        356/4.01
2017/0234974 A1\*   8/2017   Mochizuki .............. G01C 3/06
                                                        250/338.1
2019/0293791 A1\*   9/2019   Iwai ........................ G01C 3/06

FOREIGN PATENT DOCUMENTS

JP          H10-197635 A          7/1998
JP          2000-275340 A        10/2000
JP          2006-523074 A        10/2006
JP          2009-257780 A        11/2009
JP          2013-137237 A         7/2013
WO       WO-2004/093318 A2      10/2004
WO       WO-2009/105857 A1       9/2009
WO       WO-2013099348 A1 \*     7/2013    ........... G01S 7/4861

\* cited by examiner

DISTANCE MEASUREMENT DEVICE

TECHNICAL FIELD

The present invention relates to a distance measuring device.

BACKGROUND ART

Known time-of-flight (TOF) methods measure a distance from an object to a range sensor by emitting pulsed light from a light source and receiving reflected light from the object by the range sensor.

Patent Literature 1 describes a distance measuring device based on the TOF method. The device described in Patent Literature 1 has a configuration for widening the effective dynamic range of the range sensor. This device emits pulsed light from a light source and accumulates charges generated on a photodiode of the range sensor, into a capacitor. When a voltage generated in the capacitor reaches a saturation voltage, the above-described device resets the voltage and calculates the distance on the basis of the number of times of reset and the final voltage generated in the capacitor.

CITATION LIST

Patent Literature

Patent Literature 1: Japanese Unexamined Patent Publication No. 2006-523074

SUMMARY OF INVENTION

Technical Problem

An object of one aspect of the present invention is to provide a distance measuring device capable of expanding a dynamic range of intensity of reflected light.

Solution to Problem

One aspect of the present invention is a distance measuring device configured to obtain a distance to an object by a time-of-flight method, the device including a light source unit configured to emit modulated light, a sensor unit, and a processing unit.

The sensor unit includes a photosensitive region configured to generate a charge in accordance with incident light, an accumulating region configured to accumulate the charge generated in the photosensitive region, a transfer electrode provided between the photosensitive region and the accumulating region, and a reset switch provided between the accumulating region and a reset potential. The processing unit calculates the distance by controlling an emission timing of the modulated light and controlling the sensor unit. The processing unit causes the light source unit to emit modulated light in one or more emission periods in a plurality of charge transfer cycles within a frame period from connection of the accumulating region to the reset potential to next connection of the accumulating region to the reset potential by controlling the reset switch, and increases the number of emission periods per charge transfer cycle within one frame period. The processing unit accumulates the charge generated in the photosensitive region into the accumulating region by controlling a voltage applied to the transfer electrode in one or more transfer periods synchronized with the one or more emission periods.

The processing unit obtains, from the sensor unit, a plurality of read values corresponding to a charge amount accumulated in the accumulating region at an alternate point with the plurality of charge transfer cycles, in each of a plurality of read cycles corresponding to each of the plurality of charge transfer cycles. The processing unit calculates the distance on the basis of a plurality of read values.

In the distance measuring device according to the one aspect of the present invention, the processing unit increases the number of emission periods per charge transfer cycle within one frame period. That is, the number of emission periods per charge transfer cycle is small at the initial term of one frame period, and the number of emission periods per charge transfer cycle is large at the latter term of one frame period. Therefore, even in a case where the intensity of the reflected light incident on the distance measuring device is high (for example, in a case where the object is located at a short distance or the reflectance of the object is high), saturation of accumulated signal charges is unlikely to occur at the initial term of one frame period. Therefore, even in the case described above, the distance measuring device performs appropriate distance measurement. Even in a case where the intensity of the reflected light incident on the distance measuring device is low (for example, in a case where the object is located at a long distance or when the reflectance of the object is low), the shortage of accumulated signal charges is suppressed. Therefore, even in the case described above, the distance measuring device performs appropriate distance measurement. As a result, in the distance measuring device according to the one aspect, it is possible to expand the dynamic range of the intensity of the reflected light without changing one frame period.

The processing unit may increase the number of emission periods per charge transfer cycle by reducing a cycle of the emission period. Moreover, the processing unit may increase the number of emission periods per charge transfer cycle by increasing a period of the charge transfer cycle.

The processing unit may increase, in stages, the number of emission periods per charge transfer cycle. Moreover, the processing unit may gradually increase the number of emission periods per charge transfer cycle.

The sensor unit may include a first accumulating region and a second accumulating region as the accumulating region. The sensor unit may include, as the transfer electrode, a first transfer electrode provided between the photosensitive region and the first accumulating region, and a second transfer electrode provided between the photosensitive region and the second accumulating region. The sensor unit may include, as the reset switch, a first reset switch provided between the first accumulating region and the reset potential, and a second reset switch provided between the second accumulating region and the reset potential. In which cases, the processing unit accumulates the charge generated in the photosensitive region into the first accumulating region by controlling a voltage applied to the first transfer electrode in one or more first transfer periods synchronized with the one or more emission periods and accumulates the charge generated in the photosensitive region into the second accumulating region by controlling a voltage applied to the second transfer electrode in one or more second transfer periods phase-reversed with respect to the one or more first transfer periods, in a plurality of charge transfer cycles within the frame period from connection of the first accumulating region and the second accumulating region to the reset potential, to next connection of the first accumulating region and the second accumulating region to the reset potential, by controlling the first reset switch and the second reset switch. The processing unit obtains, from the sensor unit, a plurality of first read values corresponding to the charge amount accumulated in the first accumulating region at an alternate point with the plurality of charge transfer cycles and a plurality of second read values corresponding to the charge amount accumulated in the second accumulating region at the point, in each of the plurality of read cycles corresponding to each of the plurality of charge transfer cycles. The processing unit calculates the distance on the basis of the plurality of first read values and the plurality of second read values.

The processing unit may compare a sum of the first read value of the n-th read cycle and a difference value between the first read value of the n-th read cycle and the first read value of the (n−1)th read cycle, with a predetermined threshold, or may compare a sum of the second read value of the n-th read cycle and a difference value between the second read value of the n-th read cycle and the second read value of the (n−1)th read cycle, with the predetermined threshold, and when any of the sums exceeds the predetermined threshold, the processing unit may stop the read cycle of the (n+1)th and subsequent read cycles. In which case, with the use of the predetermined threshold, the first read value and the second read value obtained before saturation of the first accumulating region and the second accumulating region are used for distance measurement. Therefore, the dynamic range of the intensity of the reflected light is reliably expanded. Furthermore, when the above-described sum exceeds the predetermined threshold, the acquisition of the read value from the sensor unit is stopped, making it possible to start calculation of the distance at an early stage. Note that "n" indicates the order of the plurality of read cycles.

The processing unit may calculate a first estimated value using an approximate expression based on the plurality of first read values and calculates a second estimated value using an approximate expression based on the plurality of second read values, and may calculate the distance on the basis of the first estimated value and the second estimated value. In which case, each of the first estimated value and the second estimated value used for calculating the distance is respectively calculated using each of an approximate expression based on the first read values and an approximate expression based on the second read values, obtained before the last read cycle. Therefore, even if a portion of the first read values and the second read values obtained in the plurality of read cycles fluctuates due to disturbance, or the like, influence of the read value including the fluctuation is reduced in the first estimated value and the second estimated value. As a result, the distance measurement accuracy is enhanced.

Advantageous Effects of Invention

According to the one aspect of the present invention, provided is a distance measuring device capable of expanding the dynamic range of the intensity of reflected light.

DESCRIPTION OF EMBODIMENTS

Figure 1:
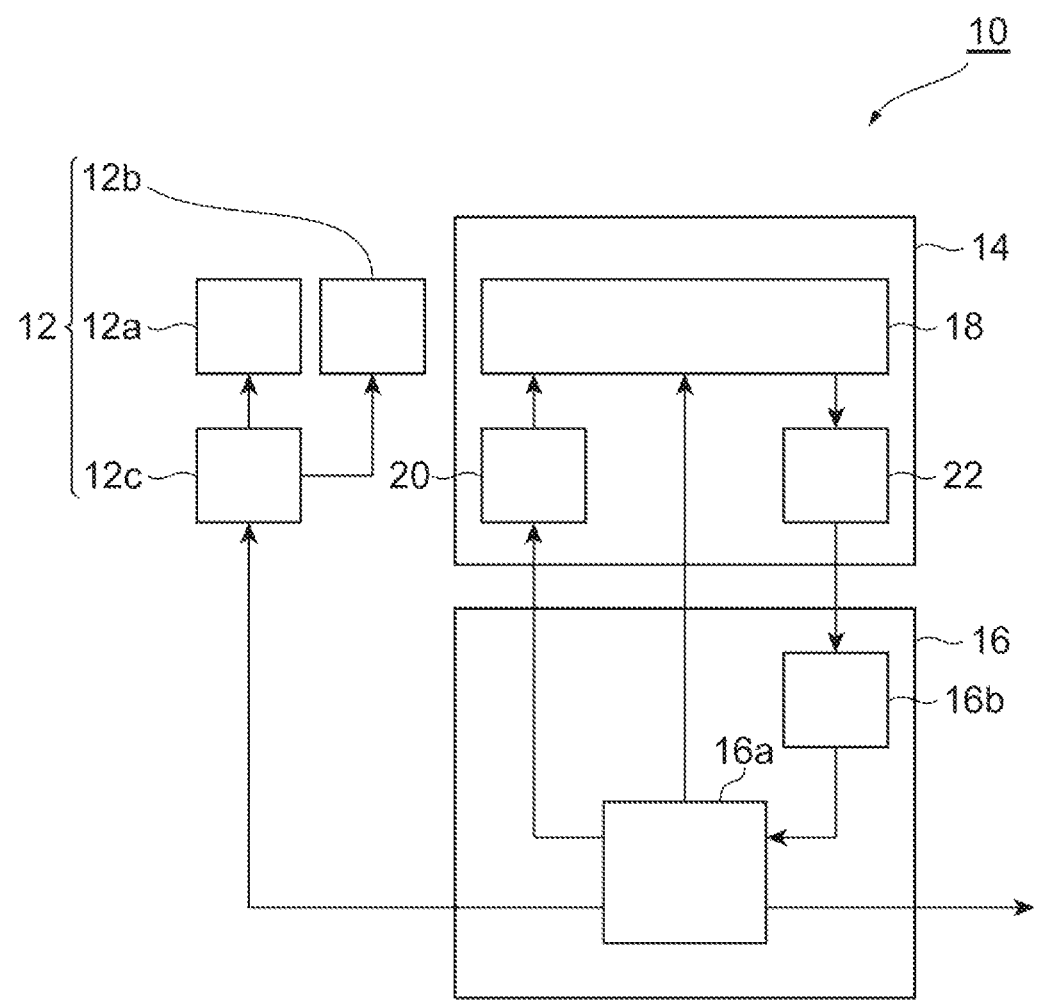
FIG. 1 is a diagram schematically illustrating a distance measuring device according to an embodiment.

Embodiments of the present invention will be described in detail with reference to the accompanying drawings. In the description, the same reference numerals are used for the same elements or elements having the same function, and redundant explanations will be omitted.

FIG. 1 is a diagram schematically illustrating a distance measuring device according to the present embodiment. A distance measuring device 10 illustrated in FIG. 1 obtains a distance between an object and the distance measuring device 10 by the time-of-flight method (TOF) method. The distance measuring device 10 includes a light source unit 12, a sensor unit 14, and a processing unit 16.

The light source unit 12 emits modulated light. In the present embodiment, the light source unit 12 may include a laser diode 12a, a reflecting member 12b, and a driver circuit 12c. The driver circuit 12c supplies the modulation current synchronized with the drive pulse signal from the processing unit 16, to the laser diode 12a. The laser diode 12a emits modulated light in accordance with the modulation current. The modulated light may include, for example, one or more beams of the pulsed light. The laser diode 12a emits pulsed light to the reflecting member 12b. The reflecting member 12b reflects the pulsed light emitted from the laser diode 12a. The pulsed light reflected on the reflecting member 12b is directed to the object.

The driver circuit 12c sends a drive signal to an actuator of the reflecting member 12b under the control of the processing unit 16. The driver circuit 12c drives the actuator in such a manner as to change an optical path of the pulsed light emitted from the laser diode 12a toward the reflecting member 12b. The actuator deflects the angle of the reflecting member 12b by the drive signal from the driver circuit 12c. The deflection of the angle of the reflecting member 12b leads to scanning of the irradiation position of the pulsed light emitted from the laser diode 12a to the object. The reflecting member 12b is, for example, a micro electro mechanical systems (MEMS) mirror.

In the present embodiment, the sensor unit 14 includes a sensor 18, a digital-analog converter (DAC) 20, and an analog-digital converter (ADC) 22. The digital-analog converter 20 converts a digital signal from a signal processing unit 16a of the processing unit 16 into an analog signal. The digital-analog converter 20 supplies the analog signal to the sensor 18. The analog-digital converter 22 converts an analog signal from the sensor 18 into a digital signal. The analog-digital converter 22 supplies the digital signal to the processing unit 16.

The processing unit 16 calculates the distance by controlling the emission timing of the modulated light of the light source unit 12 and controlling the sensor unit 14. The processing unit 16 includes the signal processing unit 16a and a memory 16b. The signal processing unit 16a is an arithmetic circuit such as a field-programmable gate array (FPGA). The memory 16b is, for example, a static random access memory (SRAM).

Figure 2:
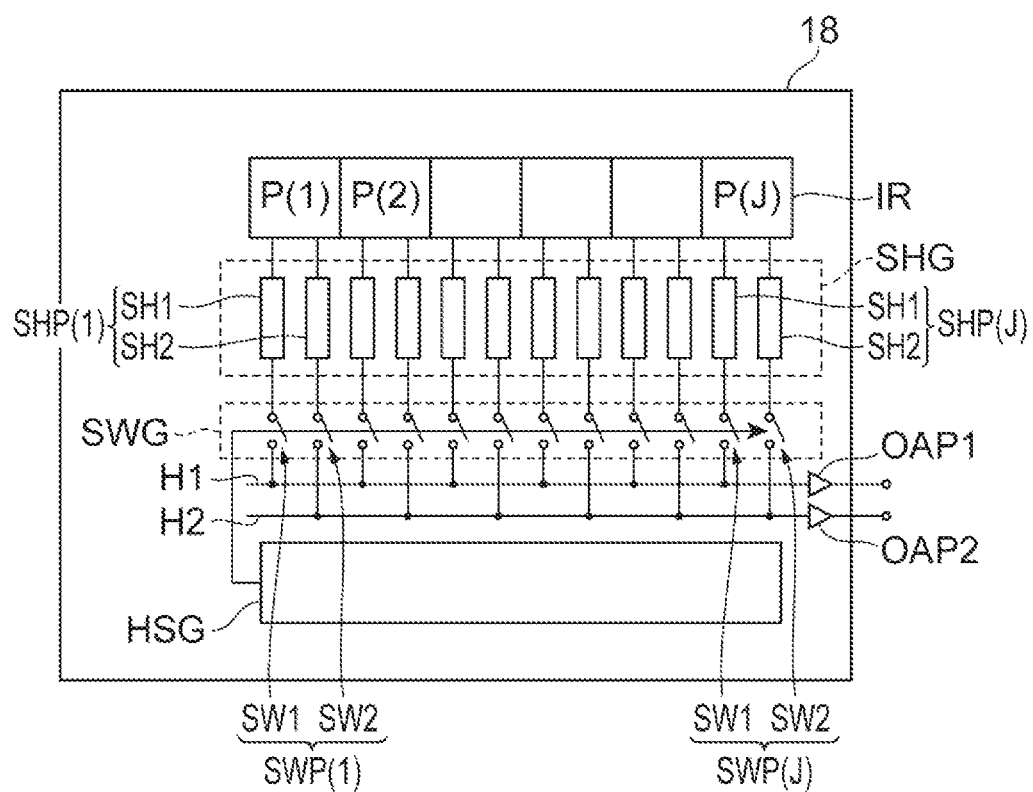
FIG. 2 is a diagram schematically illustrating an exemplary sensor.

FIG. 2 is a diagram schematically illustrating an exemplary sensor. The sensor 18 includes an imaging region IR, a sample-and-hold circuit group SHG, a switch group SWG, a horizontal shift register group HSG, signal lines H1 and H2, and output amplifiers OAP1 and OAP2. As illustrated in FIG. 2, the sensor 18 is a line sensor that obtains an image of one line, for example. In the present embodiment, the imaging region IR includes a plurality of pixel units P(j) arranged in the horizontal direction. Note that j is an integer of one to J. J is an integer of two or more and indicates the number of pixel units.

Figure 3:
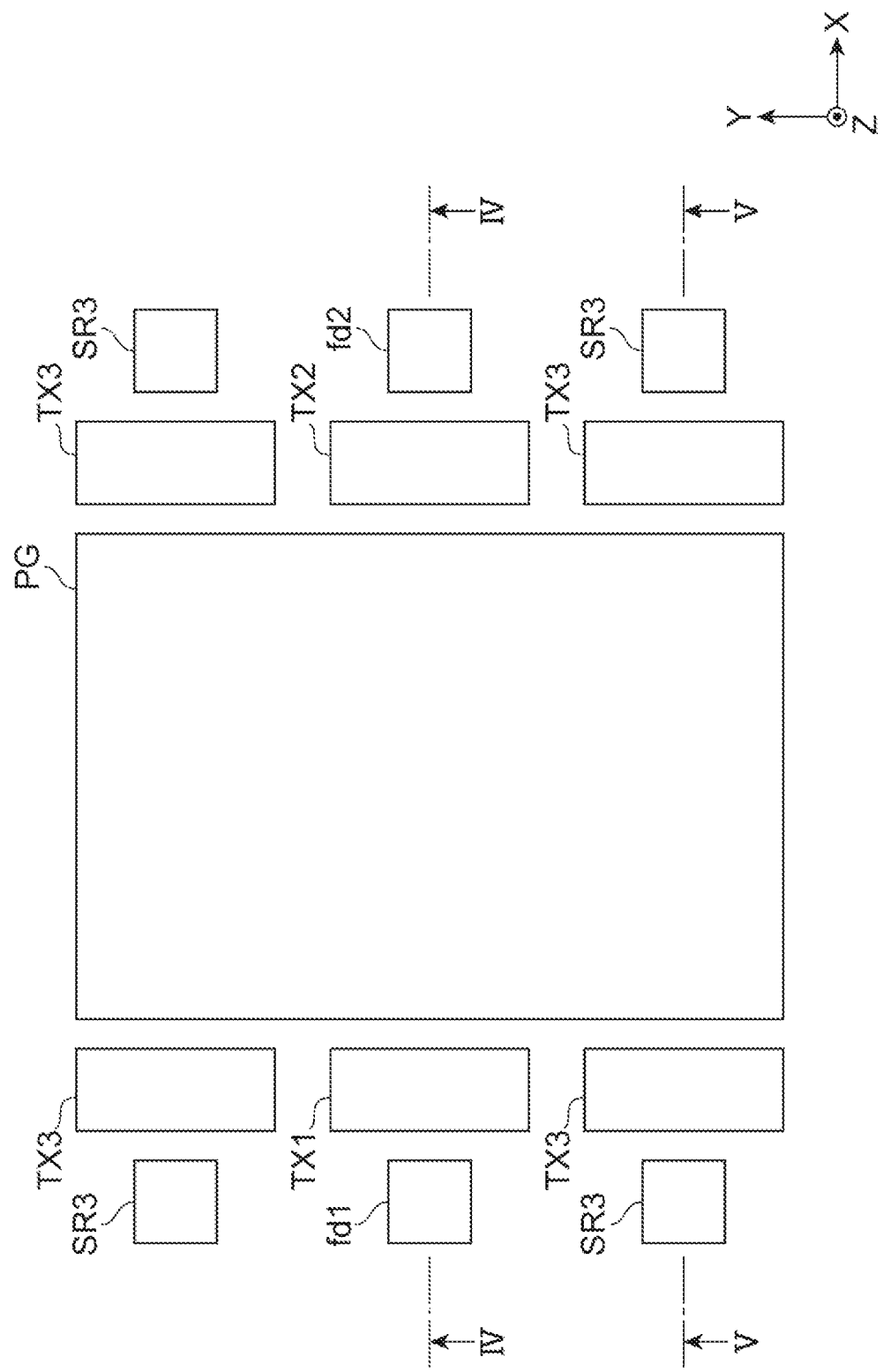
FIG. 3 is a plan view illustrating an exemplary pixel unit in the sensor.
Figure 4:
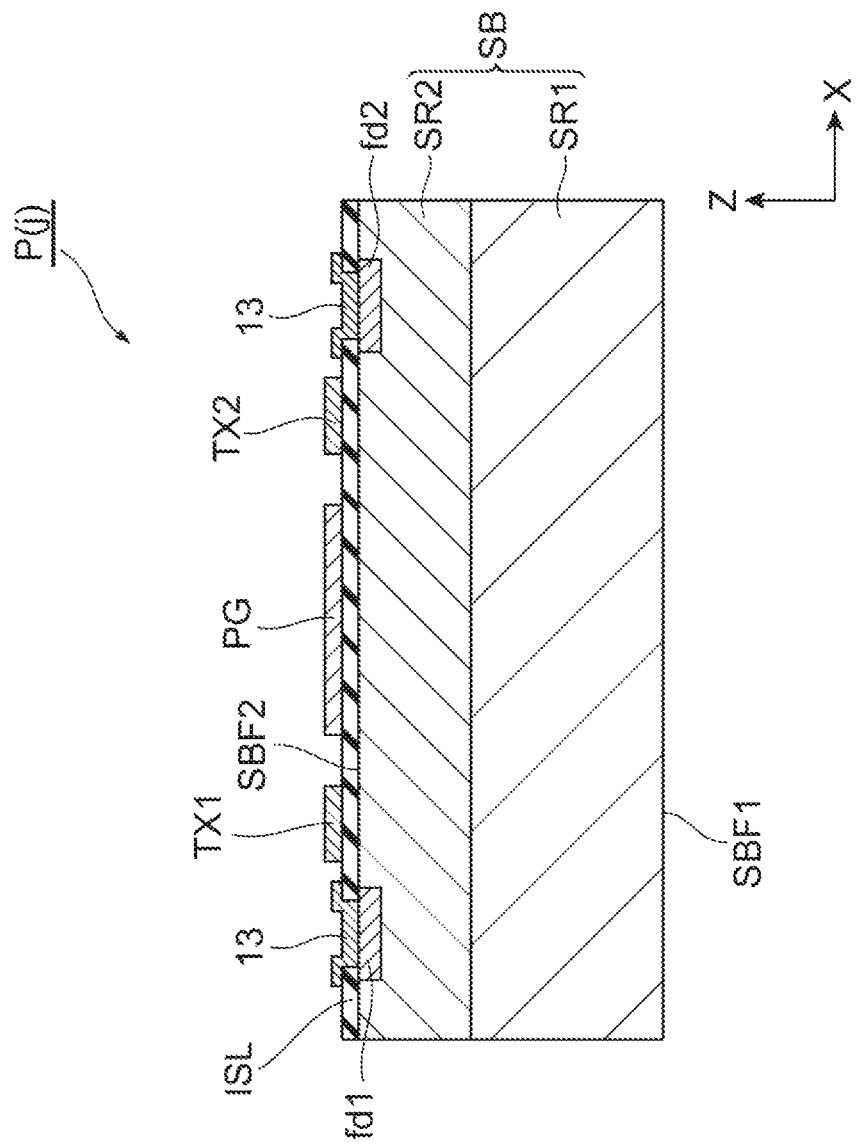
FIG. 4 is a diagram illustrating a sectional configuration taken along line IV-IV in FIG. 3.
Figure 5:
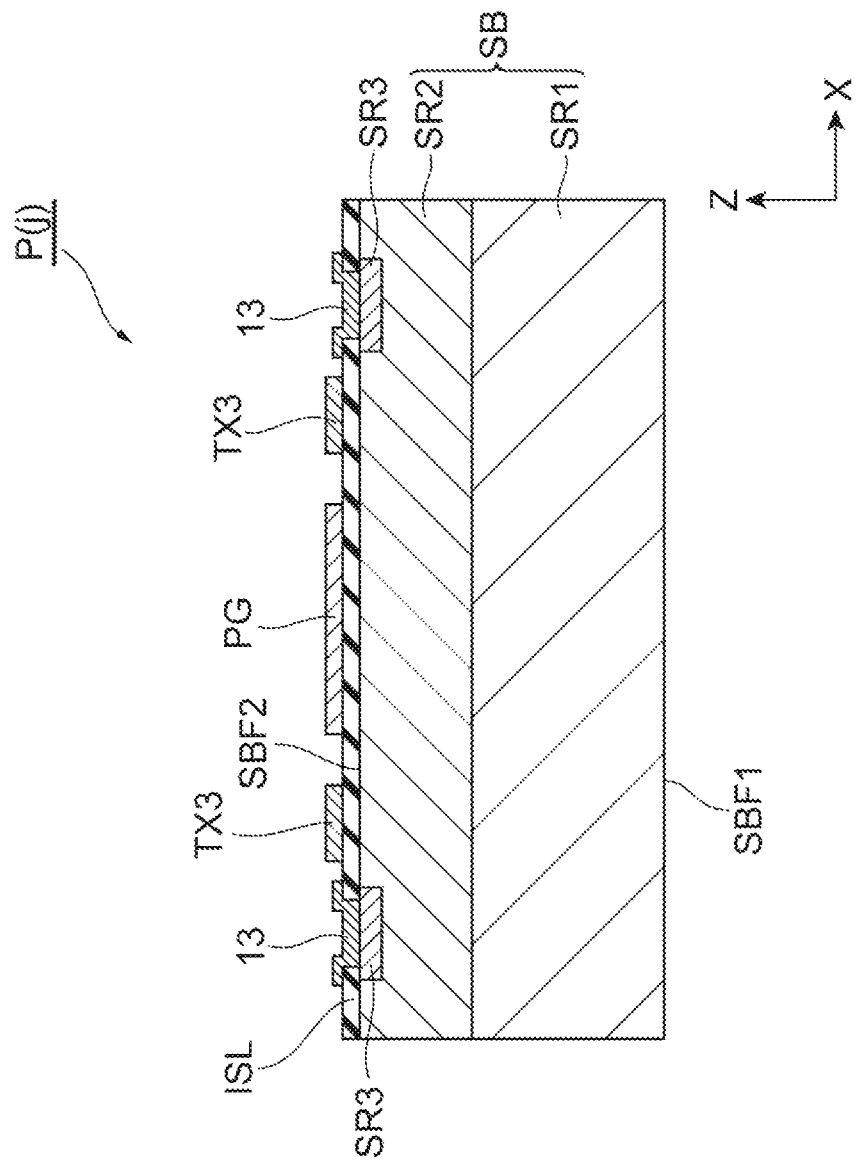
FIG. 5 is a diagram illustrating a sectional configuration taken along line V-V in FIG. 3.

FIG. 3 is a plan view illustrating an exemplary pixel unit in the sensor. FIG. 4 is a view illustrating a sectional configuration taken along line IV-IV in FIG. 3, and FIG. 5 is a view illustrating a sectional configuration taken along line V-V in FIG. 3. Each of the pixel units P(1) to P(J) has the configuration illustrated in FIGS. 3 to 5.

As illustrated in FIGS. 4 and 5, the pixel unit P(j) includes a semiconductor substrate SB in the present embodiment. The semiconductor substrate SB is a silicon substrate, for example. The semiconductor substrate SB includes a first semiconductor region SR1 and a second semiconductor region SR2. The first semiconductor region SR1 is a p type semiconductor region that provides one main surface SBF1 of the semiconductor substrate SB. The second semiconductor region SR2 is a p⁻ type semiconductor region disposed on the first semiconductor region SR1. The impurity concentration of the second semiconductor region SR2 is equal to or lower than the impurity concentration of the first semiconductor region SR1. The semiconductor substrate SB is formed, for example, by depositing the p⁻ type semiconductor region on a p type semiconductor substrate by an epitaxial growth method.

An insulating film ISL is formed on the other main surface SBF2 of the semiconductor substrate SB. The insulating film ISL is made of $SiO_2$, for example. A photogate electrode PG is disposed on the insulating film ISL. The photogate electrode PG is made of polysilicon, for example. As illustrated in FIG. 3, the photogate electrode PG can be formed in a substantially rectangular planar shape in the present embodiment. In the pixel unit P(j), a region located below the photogate electrode PG functions as a photosensitive region that generates a charge in response to incident light.

As illustrated in FIGS. 4 and 5, a first transfer electrode TX1, a second transfer electrode TX2, and a third transfer electrode TX3 are disposed on the insulating film ISL. The transfer electrodes TX1 to TX3 are made of polysilicon, for example. As illustrated in FIGS. 3 to 5, the first transfer electrode TX1 and the second transfer electrode TX2 are disposed in such a manner that the photogate electrode PG is present therebetween.

In the present embodiment, four third transfer electrodes TX3 are disposed on the insulating film ISL as illustrated in FIG. 3. The two third transfer electrodes TX3 are disposed in such a manner that the first transfer electrode TX1 is located between the two third transfer electrodes TX3 in a direction (hereinafter referred to as "Y direction") intersecting the direction in which the first transfer electrodes TX1 and the second transfer electrodes TX2 are arranged (hereinafter referred to as "X direction"). The other two third transfer electrodes TX3 are disposed in such a manner that the second transfer electrode TX2 is located between the other two third transfer electrodes TX3 in the Y direction.

As illustrated in FIG. 4, a first accumulating region fd1 and a second accumulating region fd2 are formed in the second semiconductor region SR2. The first accumulating region fd1 and the second accumulating region fd2 accumulate the charge transferred from the photosensitive region. The first accumulating region fd1 and the second accumulating region fd2 are disposed in such a manner that the photosensitive region is located between the first accumulating region fd1 and the second accumulating region fd2. The first accumulating region fd1 and the second accumulating region fd2 are, for example, n⁺ type semiconductor regions doped with an n type impurity at a high concentration.

The insulating film ISL defines an opening above the first accumulating region fd1 and the second accumulating region fd2. An electrode 13 is disposed in these openings. The electrode 13 is made of tungsten provided via a Ti/TiN film, for example.

In the X direction, the first transfer electrode TX1 is disposed between the electrode 13 on the first accumulating region fd1, and the photogate electrode PG. When the charge is transferred from the photosensitive region to the first accumulating region fd1, a voltage VTX1 that reduces the potential of the semiconductor region below the first transfer electrode TX1 is applied to the first transfer electrode TX1. The voltage VTX1 is applied from the digital-analog converter 20 on the basis of the digital signal from the signal processing unit 16a.

In the X direction, the second transfer electrode TX2 is disposed between the electrode 13 on the second accumulating region fd2, and the photogate electrode PG. When the charge is transferred from the photosensitive region to the second accumulating region fd2, a voltage VTX2 that reduces the potential of the semiconductor region below the second transfer electrode TX2 is applied to the second transfer electrode TX2. The voltage VTX2 is applied from the digital-analog converter 20 on the basis of the digital signal from the signal processing unit 16a.

As illustrated in FIG. 5, an n⁺ type semiconductor region SR3 is formed in the second semiconductor region SR2. In the present embodiment, four semiconductor regions SR3 are disposed. One pair of semiconductor regions SR3 is disposed in such a manner that the photosensitive region is located between the one pair of semiconductor regions SR3. The other pair of semiconductor regions SR3 is disposed in such a manner that the photosensitive region is located between the other pair of semiconductor regions SR3.

The insulating film ISL defines an opening above each of the semiconductor regions SR3. An electrode 13 is disposed in each of these openings. The electrode 13 is made of tungsten provided via a Ti/TiN film, for example.

In the X direction, the corresponding third transfer electrode TX3 is disposed between the electrode 13 on one semiconductor region SR3, and the photogate electrode PG. With application of a voltage VTX3 to the third transfer electrode TX3, the potential of the semiconductor region below the third transfer electrode TX3 is reduced. With the reduction of the potential of the semiconductor region below the third transfer electrode TX3, the charge is transferred from the photosensitive region to the semiconductor region SR3. The voltage VTX3 is applied from the digital-analog converter 20 on the basis of the digital signal from the signal processing unit 16a.

Figure 6:
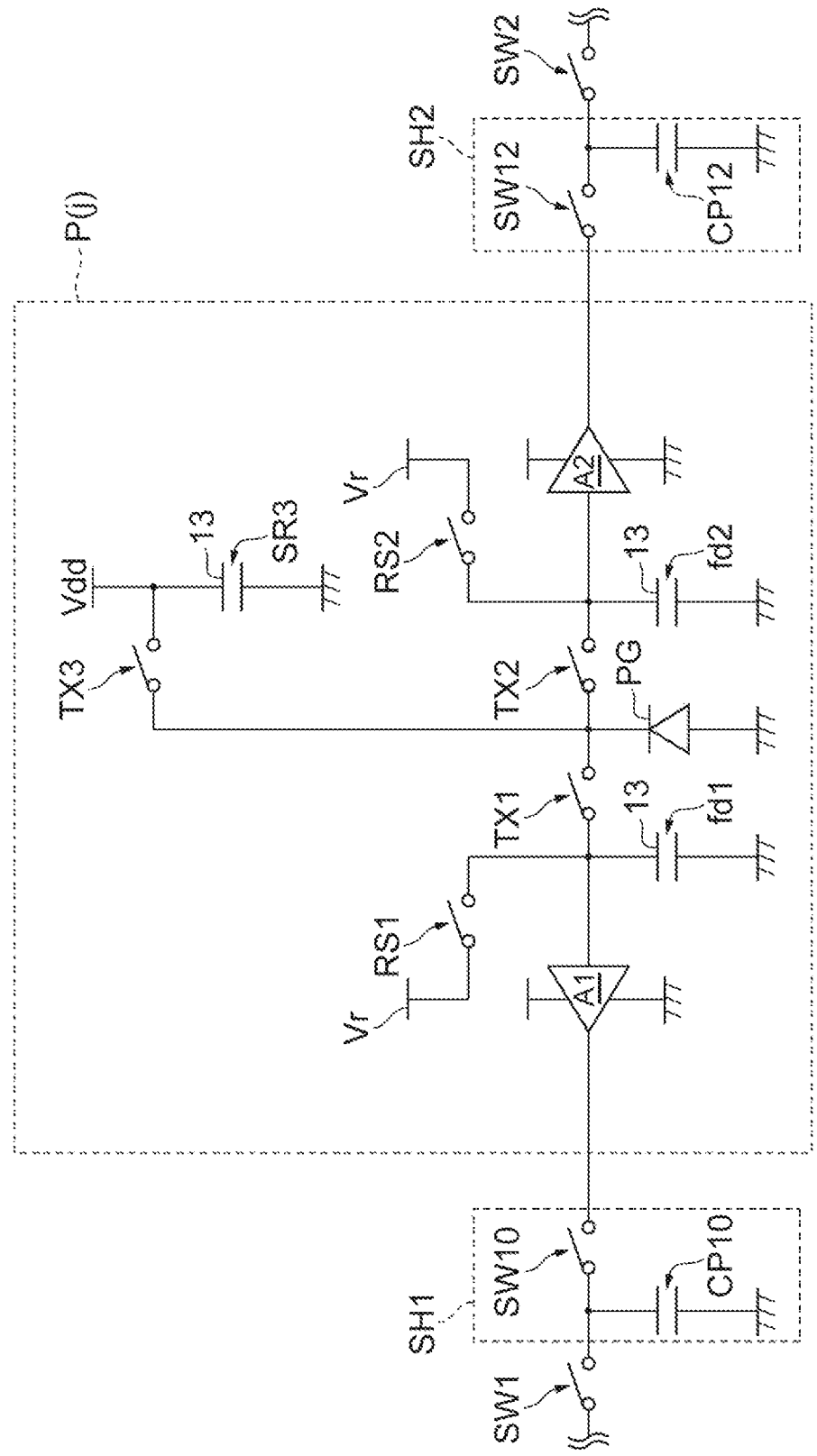
FIG. 6 is a circuit diagram of a pixel unit of the sensor unit and a sample-and-hold circuit corresponding to the pixel unit.

The electrode 13 in the semiconductor region SR3 is also connected to a predetermined potential Vdd (refer to FIG. 6). The potential Vdd is set by the digital-analog converter 20 on the basis of the digital signal from the signal processing unit 16a. When the potential of the semiconductor region below the third transfer electrode TX3 is reduced with the application of the voltage VTX3, the charge in the photosensitive region is reset.

Hereinafter, FIG. 6 will be referred to together with FIG. 2. FIG. 6 is a circuit diagram of a pixel unit of the sensor unit and a sample-and-hold circuit corresponding to the pixel unit. As illustrated in FIGS. 2 and 6, the sample-and-hold circuit group SHG of the sensor 18 includes J number of first sample-and-hold circuits SH1 and J number of second sample-and-hold circuits SH2. Each of the first sample-and-hold circuits SH1 and each of the second sample-and-hold circuits SH2 are connected to the corresponding pixel unit P(j) (corresponding pixel unit among the pixel units P(1) to P(J)). That is, the sample-and-hold circuit group SHG includes J number of sample-and-hold circuit pairs SHP(1) to SHP(J) each including one first sample-and-hold circuit SH1 and one second sample-and-hold circuit SH2. Each of the J number of sample-and-hold circuit pairs SHP(1) to SHP(J) is associated with each of the pixel units P(1) to P(J), respectively The pixel unit P(j) includes a first reset switch RS1, a second reset switch RS2, and charge-voltage conversion circuits A1 and A2. The first reset switch RS1 is located between a reset potential Vr and the electrode 13 on the first accumulating region fd1. The second reset switch RS2 is located between the reset potential Vr and the electrode 13 on the second accumulating region fd2. The reset potential Vr is set by the digital-analog converter 20 on the basis of the digital signal from the signal processing unit 16a.

A reset pulse signal Sres is applied from the signal processing unit 16a to the first reset switch RS1 and the second reset switch RS2. When a reset pulse signal Sres is applied to the first reset switch RS1 and the second reset switch RS2, the first accumulating region fd1 and the second accumulating region fd2 are connected to the reset potential Vr. This operation resets the charge in the first accumulating region fd1 and the charge in the second accumulating region fd2. The period from the timing of resetting the charges of the first accumulating region fd1 and the second accumulating region fd2 to the next reset timing is determined as a frame period Tf (refer to FIG. 8).

The input of the charge-voltage conversion circuit A1 is connected to the electrode 13 on the first accumulating region fd1. The output of the charge-voltage conversion circuit A1 is connected to a switch SW10 of the first sample-and-hold circuit SH1. The charge-voltage conversion circuit A1 converts the charge amount of the first accumulating region fd1 into a voltage and provides the voltage to the first sample-and-hold circuit SH1. The input of the charge-voltage conversion circuit A2 is connected to the electrode 13 on the second accumulating region fd2. The output of the charge-voltage conversion circuit A2 is connected to a switch SW12 of the second sample-and-hold circuit SH2. The charge-voltage conversion circuit A2 converts the charge amount of the second accumulating region fd2 into a voltage and provides the voltage to the second sample-and-hold circuit SH2.

The first sample-and-hold circuit SH1 includes the switch SW10 and a capacitor CP10. The second sample-and-hold circuit SH2 includes the switch SW12 and a capacitor CP12. A sampling pulse signal Ssamp is applied to the switch SW10 and the switch SW12 from the signal processing unit 16a. When the sampling pulse signal Ssamp is applied to the switch SW10 and the switch SW12, the output of the charge-voltage conversion circuit A1 is connected with the capacitor CP10, and the output of the charge-voltage conversion circuit A2 is connected with the capacitor CP12. With this configuration, the output voltage of the charge-voltage conversion circuit A1 is held across the capacitor CP10, and the output voltage of the charge-voltage conversion circuit A2 is held across the capacitor CP12. The period from the application of the sampling pulse signal Ssamp until the next application of the sampling pulse signal Ssamp, that is, the interval between two consecutive sampling pulse signals Ssamp is determined as a reading period.

The switch group SWG of the sensor 18 includes J number of switches SW1 and J number of switches SW2. Each of the switches SW1 and each of the switches SW2 are connected to the capacitor CP10 of the first sample-and-hold circuit SH1 for the corresponding pixel unit out of the pixel units P(1) to P(J), and connected to the capacitor CP12 of the second sample-and-hold circuit SH2. That is, the switch group SWG includes J number of switch pairs SWP(1) to SWP(J) each including one switch SW1 and one switch SW2. Each of the J number of switch pairs SWP(1) to SWP(J) is associated with each of the sample-and-hold circuit pairs SHP(1) to SHP(J), respectively.

A read pulse signal Sread is applied to the switch SW1 and the switch SW2. The read pulse signal Sread is supplied from the horizontal shift register group HSG. The horizontal shift register group HSG includes J number of horizontal shift registers. The horizontal shift register includes a flip-flop, for example. These horizontal shift registers are arranged in an arrangement direction of the pixel units P(1) to P(J). A start signal is applied from the signal processing unit 16a to the horizontal shift register located at one end in the horizontal shift register group HSG. A clock signal is applied from the signal processing unit 16a to all the horizontal shift registers. In response to the start signal and the clock signal, each of the J number of horizontal shift registers sequentially applies the read pulse signal Sread to each of the switch pairs SWP(1) to SWP(J). With the application of the read pulse signal Sread in this manner, the first sample-and-hold circuit SH1 and the second sample-and-hold circuit SH2 of the sample-and-hold circuit pairs SHP(1) to SHP(J) are sequentially connected to each of the signal line H1 and the signal line H2.

When the read pulse signal Sread is applied to the switches SW1 and SW2, each of the capacitor CP10 of the first sample-and-hold circuit SH1 and the capacitor CP12 of the second sample-and-hold circuit SH2 is connected to each of the signal line H1 and the signal line H2, respectively. With this configuration, the voltage held in the first sample-and-hold circuit SH1 is input into the output amplifier OAP1 via the signal line H1. The voltage held in the second sample-and-hold circuit SH2 is input into the output amplifier OAP2 via the signal line H2. Each of the output amplifier OAP1 and the output amplifier OAP2 amplifies the input voltage and outputs the amplified voltage to the analog-digital converter 22.

The analog-digital converter 22 converts the input voltage signal into a digital value having a value corresponding to the magnitude of the voltage signal. The digital value output by the analog-digital converter 22 is stored in the memory 16b of the processing unit 16. In the present embodiment, the digital value based on the voltage signal from the output amplifier OAP1 is stored in the memory 16b as a first read value to be described below. The more the accumulated charge amount in the first accumulating region fd1, the smaller the first read value. The digital value based on the voltage signal from the output amplifier OAP2 is stored in the memory 16b as a second read value to be described below. The more the accumulated charge amount in the second accumulating region fd2, the smaller the second read value.

Figure 7:
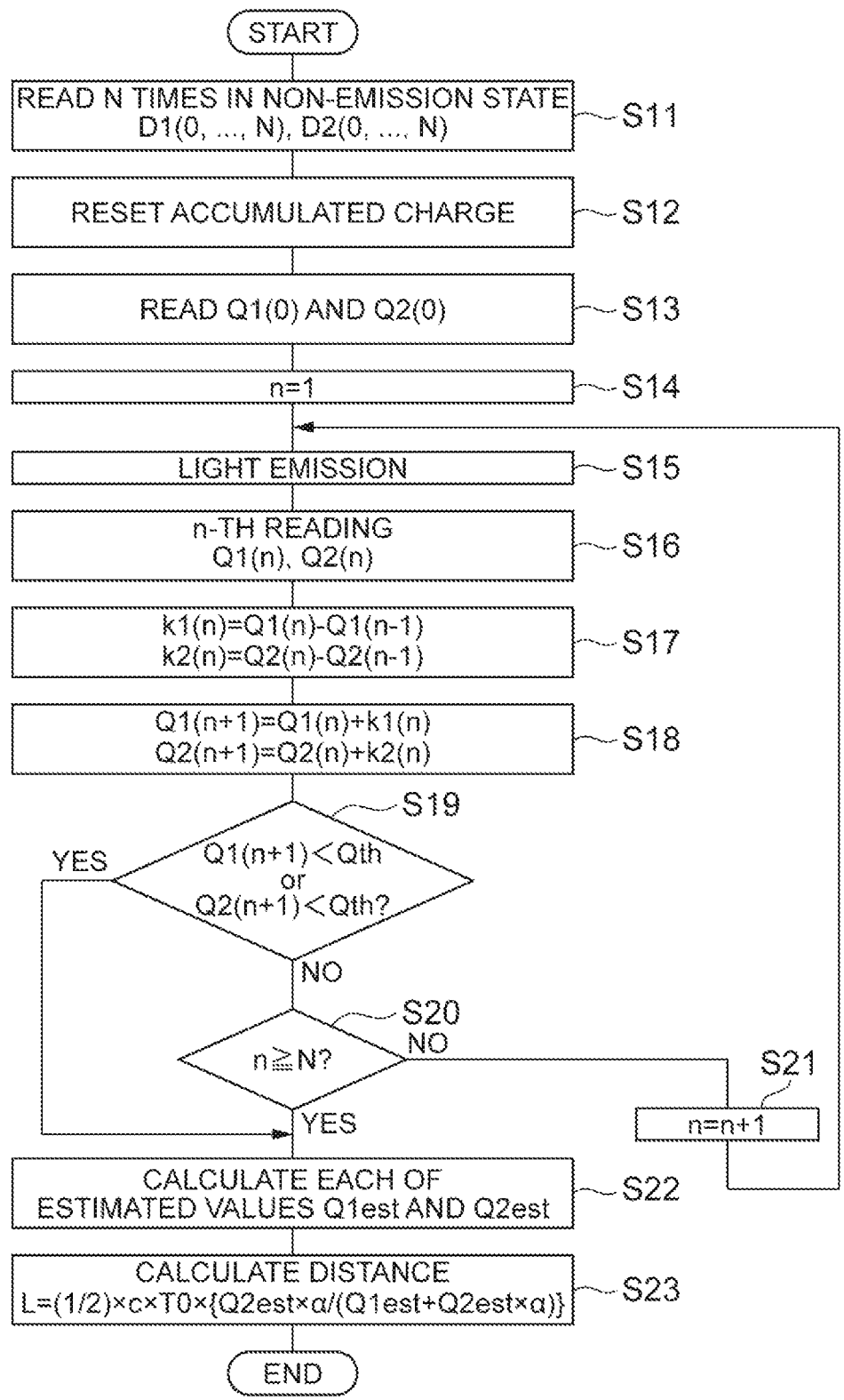
FIG. 7 is a flowchart illustrating control and calculation of a processing unit.
Figure 8:
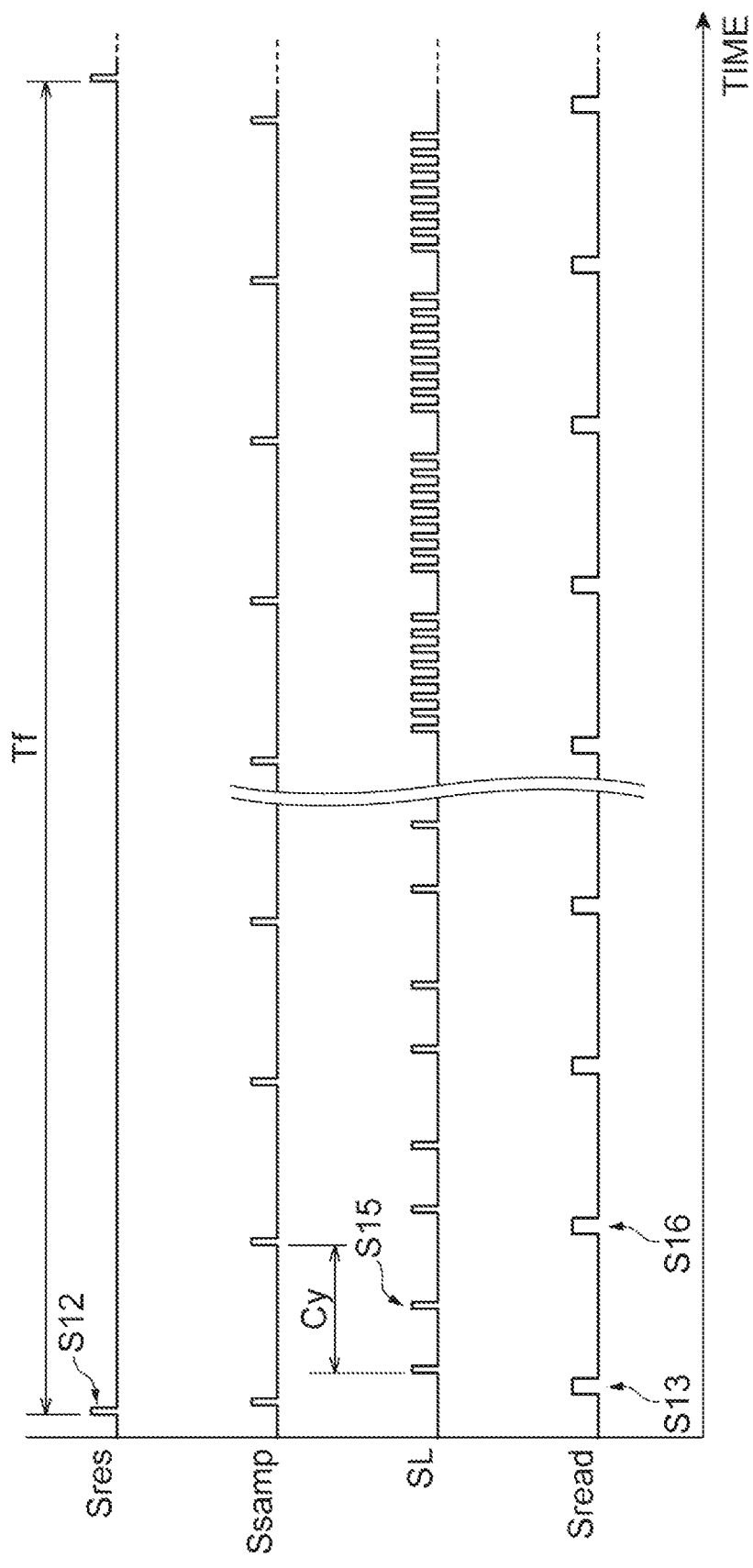
FIG. 8 is a timing chart of various signals used in the distance measuring device.
Figure 9:
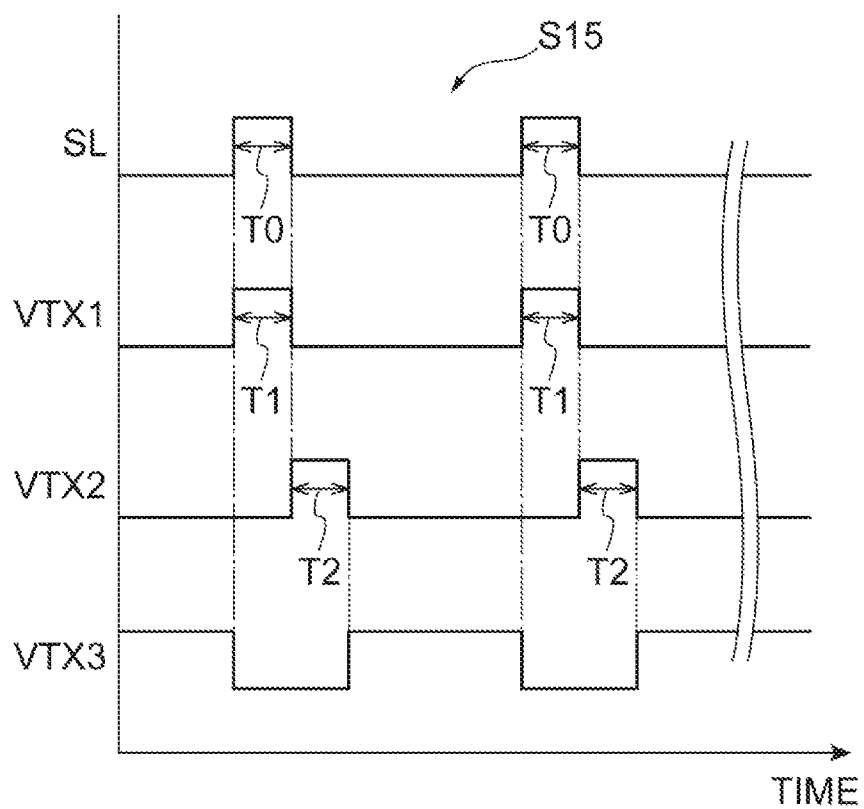
FIG. 9 is a timing chart of various signals used in the distance measuring device.

Next, control and calculation of the processing unit 16 will be described. FIG. 7 is a flowchart illustrating control and calculation of the processing unit. FIGS. 8 and 9 are timing charts of various signals used in the distance measuring device. The processing unit 16 performs control and calculation described below for each of the pixel units with reference to FIGS. 7 to 9.

In the present embodiment, the processing unit 16 initially obtains, from the sensor unit 14, N number of first read values D1 (0, . . . , N) and N number of second read values D2 (0, . . . , N) in a non-emission frame period during which the modulated light is not emitted from the light source unit 12 (S11 in FIG. 7).

Specifically, the signal processing unit 16a applies the sampling pulse signal Ssamp to the switch SW10 and the switch SW12 before the start of a first-time charge transfer cycle. With this operation, the voltage corresponding to the charge amount accumulated in the first accumulating region fd1 at a point before the first-time charge transfer cycle is held in the first sample-and-hold circuit SH1. Moreover, the voltage corresponding to the charge amount accumulated in the second accumulating region fd2 at the above-described point before the first-time charge transfer cycle is held in the second sample-and-hold circuit SH2.

Subsequently, the signal processing unit 16a sends a start signal and a clock signal to the horizontal shift register group HSG in such a manner that the read pulse signal Sread is applied from the horizontal shift register to the switches SW1 and SW2. With this operation, the processing unit 16 obtains the first read value D1(0) and the second read value D2(0) from the sensor unit 14.

Subsequently, the signal processing unit 16a executes the first to N-th charge transfer cycles and the first to N-th read cycles as described below. Note that N is a numerical value indicating the order of a predetermined maximum charge transfer cycle. Hereinafter, the symbol "n" will be used as an index indicating the order of the read cycles.

The signal processing unit 16a applies a digital signal to the sensor unit 14 in such a manner that the high level voltage signal VTX1 is applied to the first transfer electrode TX1 during a first transfer period T1 of the n-th charge transfer cycle. With this operation, the potential of the semiconductor region below the first transfer electrode TX1 that is, the potential of the semiconductor region between the photosensitive region and the first accumulating region fd1 decreases in the first transfer period T1, and thus, a charge is transferred from the photosensitive region to the first accumulating region fd1. The signal processing unit 16a applies a digital signal to the sensor unit 14 in such a manner that the high level voltage signal. VTX2 is applied to the second transfer electrode TX2 within the second transfer period T2 of the n-th charge transfer cycle. With this operation, the potential of the semiconductor region below the second transfer electrode TX2, that is, the potential of the semiconductor region between the photosensitive region and the second accumulating region fd2 decreases in the second transfer period T2, and thus, a charge is transferred from the photosensitive region to the second accumulating region fd2.

The first transfer period T1 and the second transfer period T2 in the non-emission frame period are set similarly to the first transfer period T1 and the second transfer period T2 of the light emission frame period to be described below. The total length of the first transfer period T1 in each of the charge transfer cycles in the non-emission frame period is the same as the total length of the first transfer period T1 in each of the charge transfer cycles of the light emission frame period. The total length of the second transfer period T2 in each of the charge transfer cycles in the non-emission frame period is the same as the total length of the second transfer period T2 in each of the charge transfer cycles in the light emission frame period.

In the present embodiment, the signal processing unit 16a applies a digital signal to the sensor unit 14 in such a manner that the low level voltage signal VTX3 is applied to the third transfer electrode TX3 during the first transfer period T1 and the second transfer period T2. Therefore, the potential of the semiconductor region between the photosensitive region and the semiconductor region SR3 is maintained to be at a high level during the first transfer period T1 and the second transfer period T2, and thus, the charge generated in the photosensitive region is not transferred to the semiconductor region SR3. In contrast, the high level voltage signal VTX3 is applied to the third transfer electrode TX3 during a period other than the first transfer period T1 and the second transfer period T2. Therefore, the charge generated in the photosensitive region is transferred to the semiconductor region SR3 and removed during the period other than the first transfer period T1 and the second transfer period T2.

Subsequently, the signal processing unit 16a applies the sampling pulse signal Ssamp to the switch SW10 and the switch SW12 at a point between the end point of the n-th charge transfer cycle and the start point of the (n+1)th charge transfer cycle. With this operation, the voltage corresponding to the charge amount accumulated in the first accumulating region fd1 at an alternate point with the plurality of charge transfer cycles is held in the first sample-and-hold circuit SH1, and the voltage corresponding to the charge amount accumulated in the second accumulating region fd2 at the point is held in the second sample-and-hold circuit SH2. Subsequently, the signal processing unit 16a applies the start signal and the clock signal to the horizontal shift register group HSG in the n-th read cycle in such a manner that the read pulse signal Sread is applied from the horizontal shift register to the switches SW1 and SW2. With this operation, the processing unit 16 obtains the first read value D1(n) and the second read value D2(n) from the sensor unit 14.

The processing unit 16 obtains the first read value D1 (0, . . . , N) and the second read value D2 (0, . . . , N) from the sensor unit 14, and stores the read values in the memory 16b. In the charge transfer cycle in the non-emission frame period, the processing unit 16 does not allow the light source unit 12 to emit modulated light. Therefore, the first read value D1 (0, . . . , N) and the second read value D2 (0, . . . , N) obtained in the non-emission frame period reflects merely a noise component such as background light. Each of the first read value D1 (0, . . . , N) and the second read value D2 (1, . . . , N) is respectively subtracted from each of a first read value Q1 (0, . . . , N) and a second read value Q2 (1, . . . , N) obtained afterward in the light emission frame period, in order to remove the noise component such as background light.

Subsequently, the signal processing unit 16a of the processing unit 16 applies the reset pulse signal Sres to the first reset switch RS1 and the second reset switch RS2, and connects the first accumulating region fd1 and the second accumulating region fd2 to the reset potential Vr. With this operation, the charge accumulated in the first accumulating region fd1 and the charge accumulated in the second accumulating region fd2 are reset (S12 in FIG. 7), and then, the light emission frame period as the next frame period Tf is started. In the charge transfer cycle in the light emission frame period, a drive pulse signal is applied to the light source unit 12 from the signal processing unit 16a, and the light source unit 12 emits modulated light at a predetermined timing.

In the light emission frame period, the processing unit 16 obtains the first read value Q1(0) and the second read value Q2(0) from the sensor unit 14, and stores each of the first read value Q1(0) and the second read value Q2(0) in the memory 16b as an initial value of each of the first read value and the second read value (S13 in FIG. 7).

Specifically, the signal processing unit 16a applies the sampling pulse signal Ssamp to the switch SW10 and the switch SW12 before the start of the first-time charge transfer cycle Cy. With this operation, the voltage corresponding to the charge amount accumulated in the first accumulating region fd1 at the point before the first-time charge transfer cycle is held in the first sample-and-hold circuit SH1, and the voltage corresponding to the charge amount accumulated in the second accumulating region fd2 at the point is held in the second sample-and-hold circuit SH2.

Subsequently, the signal processing unit 16a sends a start signal and a clock signal to the horizontal shift register group HSG in such a manner that the read pulse signal Sread is applied from the horizontal shift register to the switches SW1 and SW2. With this operation, the processing unit 16 obtains the first read value Q1(0) and the second read value Q2(0) from the sensor unit 14. That is, the charge accumulated in the n-th charge transfer cycle Cy is read in the read cycle between the end point of the n-th charge transfer cycle Cy and the start point of the (n+1)th charge transfer cycle Cy.

Each of the first read value Q1(0) and the second read value Q2(0) corresponds to the charge amount accumulated in the first accumulating region fd1 and the charge amount accumulated in the second accumulating region fd2, respectively, at the output point of the initial sampling pulse signal Ssamp, that is, at a point before the first-time charge transfer cycle. Therefore, the first read value Q1(0) and the second read value Q2(0) do not reflect the signal light component generated by the reflection of the modulated light from the light source unit 12, from the object.

Subsequently, the signal processing unit 16a sets n to 1 (S14 in FIG. 7) and attempts the first to N-th charge transfer cycles Cy and the first to N-th read cycles as described below. The reading period (period between two consecutive sampling pulse signals Ssamp) includes the charge transfer cycle Cy and the read cycle.

First, as also illustrated in FIG. 8, the signal processing unit 16a applies one or more drive pulse signals SL to the light source unit 12 in the n-th charge transfer cycle Cy, and allows the light source unit 12 to emit modulated light for the number of times same as the number of drive pulse signal SL (S15 in FIG. 7). That is, the number m of emission periods of modulated light from the light source unit 12 is one or more in the n-th charge transfer cycle Cy. The time length of each of the emission periods is T0, as also illustrated in FIG. 9.

As also illustrated in FIG. 9, the signal processing unit 16a applies a digital signal to the sensor unit 14 in such a manner that the high level voltage signal VTX1 is applied to the first transfer electrode TX1 within the first transfer period T1 of the n-th charge transfer cycle Cy. The signal processing unit 16a applies a digital signal to the sensor unit 14 in such a manner that the high level voltage signal VTX2 is applied to the second transfer electrode TX2 within the second transfer period T2 of the n-th charge transfer cycle Cy.

The first transfer period T1 is synchronized with the drive pulse signal SL. That is, the rise timing of the drive pulse signal SL and the rise timing of the voltage signal VTX1 are substantially synchronized with each other. The duration T0 of the drive pulse signal SL and the first transfer period T1 are substantially the same time length.

The second transfer period T2 is inverted in phase with the first transfer period T1. That is, in each of the charge transfer cycles Cy, the phase of the second transfer period T2 is delayed by 180 degrees from the phase of the first transfer period T1. More specifically, the fall timing of the voltage signal VTX1 and the rise timing of the voltage signal VTX2 are substantially synchronized with each other. The first transfer period T1 and the second transfer period T2 have substantially the same time length.

In the present embodiment, the signal processing unit 16a applies a digital signal to the sensor unit 14 in such a manner that the low level voltage signal VTX3 is applied to the third transfer electrode TX3 during the first transfer period T1 and the second transfer period T2. The high level voltage signal VTX3 is applied to the third transfer electrode TX3 during a period other than the first transfer period T1 and the second transfer period T2. Therefore, the charge corresponding to the incident light into the photosensitive region is not transferred to the semiconductor region SR3 during the first transfer period T1 and the second transfer period T2. However, the charge generated in the photosensitive region is transferred to the semiconductor region SR3 and removed during a period other than the first transfer period T1 and the second transfer period T2.

As described above, the first transfer period T1 is provided in synchronization with each of the emission periods of the modulated light, and the second transfer period T2 phase-reversed with respect to the first transfer period T1 is provided. Therefore, the first transfer period T1 equal in number to the number of drive pulse signals SL and the second transfer period T2 equal in number to the number of drive pulse signals SL are provided in the n-th charge transfer cycle Cy. In the n-th charge transfer cycle Cy, the time length for storing the charge in the first accumulating region fd1 is the product of the first transfer period T1 (time T0) and the number of times of the drive pulse signal SL (number of emission periods). In the n-th charge transfer cycle Cy, the time length for storing the charge in the second accumulating region fd2 is the product of the second transfer period T2 (time T0) and the number of times of the drive pulse signal SL (number of emission periods).

Subsequently, the signal processing unit 16a obtains the first read value Q1($n$) and the second read value Q2($n$) from the sensor unit 14, and stores the first read value Q1(n) and the second read value Q2(n) in the memory 16b (S16 in FIG. 7).

Specifically, the signal processing unit 16a applies the sampling pulse signal Ssamp to the switch SW10 and the switch SW12 between the end point of the n-th charge transfer cycle Cy and the start point of the (n+1)th charge transfer cycle Cy. With this operation, the voltage corresponding to the charge amount accumulated in the first accumulating region fd1 at an alternate point with the plurality of charge transfer cycles Cy is held in the first sample-and-hold circuit SH1, and the voltage corresponding to the charge amount accumulated in the second accumulating region fd2 at the point is held in the second sample-and-hold circuit SH2.

Subsequently, the signal processing unit 16a applies the start signal and the clock signal to the horizontal shift register group HSG in the n-th read cycle in such a manner that the read pulse signal Sread is applied from the horizontal shift register to the switches SW1 and SW2. With this operation, the processing unit 16 obtains the first read value Q1(n) and the second read value Q2(n) from the sensor unit 14. That is, the charge accumulated in the n-th charge transfer cycle Cy is read in the read cycle between the end point of the n-th charge transfer cycle Cy and the start point of the (n+1)th charge transfer cycle Cy. The first read value Q1(n) is a value corresponding to the charge amount accumulated in the first accumulating region fd1 at the point between the end of the n-th charge transfer cycle Cy and the start of the (n+1)th charge transfer cycle Cy, and the second read value Q2(n) is a value corresponding to the charge amount accumulated in the second accumulating region fd2 at the point.

Subsequently, the signal processing unit 16a obtains a first difference value k1(n) and a second difference value k2(n) (S17 in FIG. 7). The first difference value k1(n) is obtained by subtracting a first read value Q1(n−1) of the (n−1)th read cycle from the first read value Q1(n) of the n-th read cycle. The second difference value k2(n) is obtained by subtracting a second read value Q2(n−1) of the (n−1)th read cycle from the second read value Q2(n) of the n-th read cycle.

Subsequently, the signal processing unit 16a obtains a predicted value Q1(n+1) and a predicted value Q2(n+1) (S18 in FIG. 7). The predicted value Q1(n+1) is obtained by adding the first difference value k1(n) to the first read value Q1(n) of the n-th read cycle. The predicted value Q2(n+1) is obtained by adding the second difference value k2(n) to the second read value Q2(n) of the n-th read cycle. The predicted value Q1(n+1) is the predicted value of the first read value of the (n+1)th read cycle and the predicted value Q2(n+1) is the predicted value of the second read value of the (n+1)th read cycle.

Subsequently, the signal processing unit 16a compares each of the first predicted value Q1(n+1) and the second predicted value Q2(n+1), with a predetermined threshold Qth (S19 in FIG. 7). In the present embodiment, the threshold Qth is set to a value equal to or larger than the first read value corresponding to the saturation storage capacity of the first accumulating region fd1, and the threshold Qth is set to a value equal to or larger than the second read value corresponding to the saturation storage capacity of the second accumulating region fd2. When the first predicted value Q1(n+1) is equal to or larger than the threshold Qth and the second predicted value Q2(n+1) is equal to or larger than the threshold Qth, the determination result of the processing in S19 is "No", and then, the processing of the signal processing unit 16a proceeds to the processing in S20.

The processing in S20 tests whether n is N or more. When n is smaller than N in the processing in S20, the signal processing unit 16a increments the value of n by one (S21 in FIG. 7) and repeats the processing from S15. When n is N or more in the processing in S20, the processing of the signal processing unit 16a proceeds to S22.

When any of the first predicted value Q1(n+1) and the second predicted value Q2(n+1) exceeds the threshold Qth as a result of the processing (comparison) in S19, that is, the value is smaller than the threshold, the processing of the signal processing unit 16a proceeds to S22. Therefore, when any of the first predicted value Q1 (n+1) and the second predicted value Q2 (n+1) exceeds the threshold Qth, the processing unit 16 stops the (n+1)th and subsequent read cycles. That is, the signal processing unit 16a stops acquisition of the first read value and the second read value from the sensor unit 14 in the (n+1)th and subsequent read cycles, and stops storage of the first read value and the second read value in the (n+1)th and subsequent read cycles into the memory 16b.

When the threshold Qth is equal to the larger read value among the first read value corresponding to the saturation storage capacity of the first accumulating region fd1 and the second read value corresponding to the saturation storage capacity of the second accumulating region fd2, the processing unit 16 can obtain the first read value Q1(n) in a range not exceeding the read value corresponding to the saturation storage capacity of the first accumulating region fd1, and the processing unit 16 can obtain the second read value Q2(n) in a range not exceeding the read value corresponding to the saturation storage capacity of the second accumulating region fd2. As a result, the dynamic range of the measured distance can be enhanced. Moreover, the distance measurement accuracy is enhanced. Furthermore, it is possible to start the calculation of the processing in S22 and subsequent processing of the signal processing unit 16a at an early stage.

In the present embodiment, the threshold Qth may be set to a value larger than the value that is the larger among the first read value corresponding to the saturation storage capacity of the first accumulating region fd1 and the second read value corresponding to the saturation storage capacity of the second accumulating region fd2. According to this embodiment, it is possible to use the sensor unit 14 within a range having excellent linearity of the relationship between the accumulated charge amount and the incident light amount in each of the first accumulating region fd1 and the second accumulating region fd2. Therefore, the distance measurement accuracy is further enhanced.

Subsequently, the signal processing unit 16a obtains a first estimated value Q1est and a second estimated value Q2est (S22 in FIG. 7). Specifically, the signal processing unit 16a creates an approximate expression based on the first read values Q1(0) to Q1(n) until the n-th read cycle as the last read cycle, and calculates a correction value Q1corr of the first read value Q1 using the approximate expression. Then, as illustrated in the following expression (1), the signal processing unit 16a calculates the first estimated value Q1est by subtracting the read value D1(n) from the sum of the correction value Q1corr of the first read value Q1 and the first read value Q1(0).

$$Q1est = Q1corr + Q1(0) - D1(n) \qquad \text{<Expression (1)>}$$

Similarly, the signal processing unit 16a creates an approximate expression based on the second read values Q2(0) to Q2(n) until the n-th read cycle as the last read cycle, and calculates a correction value Q2corr of the second read value Q2 using the approximate expression. Then, as illustrated in the following expression (2), the signal processing unit 16a calculates the second estimated value Q2est by subtracting the read value D2(n) from the sum of the correction value Q2corr of the second read value Q2 and the second read value Q2(0).

$$Q2est = Q2corr + Q2(0) - D2(n) \qquad <\text{Expression (2)}>$$

In the present embodiment, the correction value Q1corr of the first read value Q1 is a correction value of the first read value Q1(n) of the n-th read cycle, while the correction value Q2corr of the second read value Q2 is a correction value of the second read value Q2(n) of the n-th cycle. As long as the correction values Q1corr and Q2corr are correction values obtained as outputs of the approximate expression, the number of the corresponding read cycle is not limited.

The approximate expression is created on the basis of the least squares method, for example. The approximate expression may be created using another known approximate expression creation method. The signal processing unit 16a may calculate a correction value of the read value D1 using an approximate expression based on the read values D1(0) to D1(n), and may calculate the first estimated value Q1est by subtracting the correction value of the read value D1 from the sum of the correction value Q1corr of the first read value Q1 and the first read value Q1(0). Each of the correction value of the read value D1 and the correction value Q1corr of the read value Q1 is each of the correction value of the read value D1 and the correction value of the read value Q1 in the read cycle in the same order. Similarly, the signal processing unit 16a may calculate a correction value of the read value D2 using an approximate expression based on the read values D2(0) to D2(n), and may calculate the second estimated value Q2est by subtracting the correction value of the read value D2 from the sum of the correction value Q2corr of the second read value Q2 and the second read value Q2(0). Each of the correction value of the read value D2 and the correction value Q2corr of the read value Q2 is each of the correction value of the read value D2 and the correction value of the read value Q2 in the read cycle in the same order.

The first estimated value Q1est is a value obtained by subtracting the first read value corresponding to the noise component such as background light obtained at another frame period, from the sum of the correction value of the first read value calculated using the approximate expression and the first read value Q1(0). The second estimated value Q2est is a value obtained by subtracting the second read value corresponding to the noise component such as background light obtained at another frame period, from the sum of the correction value of the second read value calculated using the approximate expression and the first read value Q1(0). Therefore, even when a portion of the first read value and the second read value obtained before the last read cycle fluctuates due to disturbance, or the like, the influence of the read value including the fluctuation is reduced in the first estimated value Q1est and the second estimated value In Q2est based on the approximate expression. Influence of noise such as background light is reduced in the first estimated value Q1est and the second estimated value Q2est.

Subsequently, the signal processing unit 16a calculates a distance (S23 in FIG. 7), Specifically, the signal processing unit 16a calculates a distance L by calculation of the following expression (3).

$$L = (\tfrac{1}{2}) \times c \times T0 \times \{Q2est \times \alpha / (Q1est + Q2est \times \alpha)\} \qquad <\text{Expression (3)}>$$

Here, c is the velocity of light. α is the ratio of the first read value and the second read value when the same amount of incident light enters the photosensitive region during the first transfer period T1 and the second transfer period T2. In this manner, the signal processing unit 16a calculates the distance to the object with high accuracy using the ratio of the first estimated value Q1est based on the accumulated charge amount of the first accumulating region fd1 and the second estimated value Q2est based on the accumulated charge amount of the second accumulating region fd2. In the present embodiment, the signal processing unit 16a outputs a line of a distance image having a grayscale value corresponding to the distance calculated for each of the pixels. In the present embodiment, the signal processing unit 16a may repeat the control and calculation described with reference to FIGS. 7 to 9 in such a manner as to update the distance image for each of the frame periods Tf.

Meanwhile, as illustrated in FIG. 8, the signal processing unit 16a increases the number m of emission periods per charge transfer cycle Cy within one frame period Tf. Specifically, the signal processing unit 16a increases the number m of emission periods per charge transfer cycle Cy by reducing the cycle of the emission period. That is, the signal processing unit 16a increases the number m of emission periods per charge transfer cycle Cy by reducing the cycle of the emission period. The signal processing unit 16a decreases the number m of the emission period per charge transfer cycle Cy by increasing the cycle of the emission period.

The cycle of the emission period at an initial term of one frame period Tf is longer than the cycle of the emission period at a latter term of one frame period Tf. That is, the cycle of the emission period at the latter term of one frame period Tf is shorter than the cycle of the emission period at the initial term of one frame period Tf. The cycle of the emission period monotonically decreases within one frame period Tf. In the present specification, "monotonically decreasing" means that it has no increasing tendency, that is, monotonically decreasing in a broad sense. In one frame period Tf, the length of the reading period is constant, with no change in the period of the charge transfer cycle Cy.

The signal processing unit 16a increases, in stages, the number m of emission periods per charge transfer cycle Cy. For example, the number m of the emission periods per charge transfer cycle Cy is "two" at the initial term of one frame period Tf, and the number of emission periods per charge transfer cycle Cy is "M" in the latter term of one frame period Tf. That is, the signal processing unit 16a increases the number of emission periods per charge transfer cycle Cy in two stages. Note that M is a predetermined numerical value as the maximum value of the number of emission periods per charge transfer cycle Cy.

The number m of emission periods per charge transfer cycle Cy monotonically increases within one frame period Tf. In the present specification, "monotonically increasing" means that it has no decreasing tendency, that is, monotonically increasing in a broad sense.

In the distance measuring device 10 of the present embodiment, the cycle of the emission period is longer at the initial team of one frame period Tf than at the latter term of one frame period Tf, leading to the fewer number m of emission periods per charge transfer cycle Cy. Therefore, even when the intensity of the reflected light incident on the pixel unit P(j) of the sensor 18 is high (for example, when the object is located at a short distance or the reflectance of the object is high), saturation of accumulated signal charges tends not to occur at the initial term of one frame period Tf. Therefore, appropriate distance measurement is performed in the distance measuring device 10.

In the latter term of one frame period Tf, the cycle of the emission period is shorter than the initial term of one frame period Tf, leading to the more number m of emission periods per charge transfer cycle Cy. Therefore, even when the intensity of the reflected light incident on the pixel unit P(j) of the sensor 18 is low (for example, when the object is located at a long distance or the reflectance of the object is low), shortage of accumulated signal charge is suppressed. Therefore, appropriate distance measurement is performed in the distance measuring device 10.

As described above, according to the distance measuring device 10 of the present embodiment, it is possible to expand the dynamic range of intensity of reflected light without changing one frame period. Tf.

Figure 10:
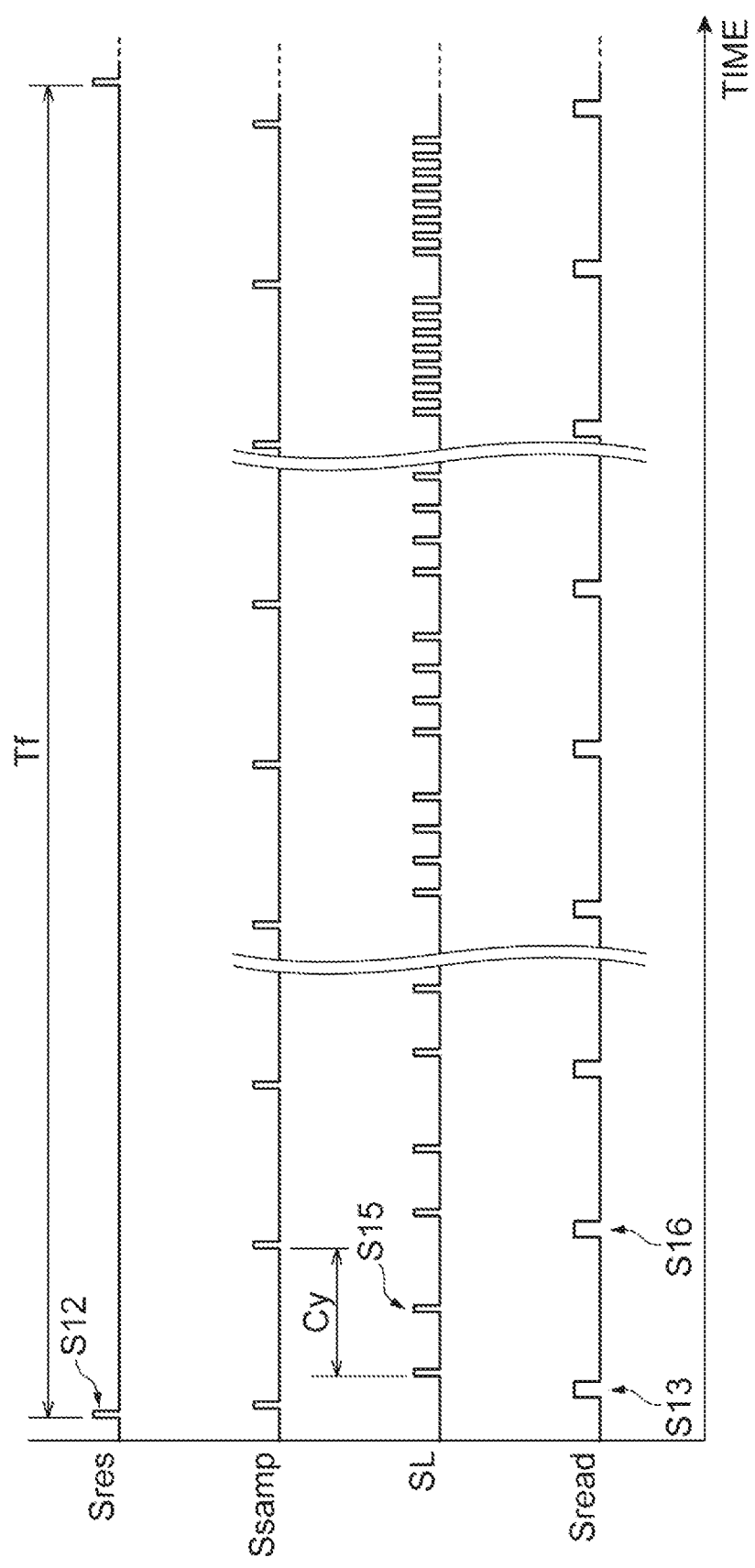
FIG. 10 is a timing chart of various signals used in the distance measuring device.
Figure 11:
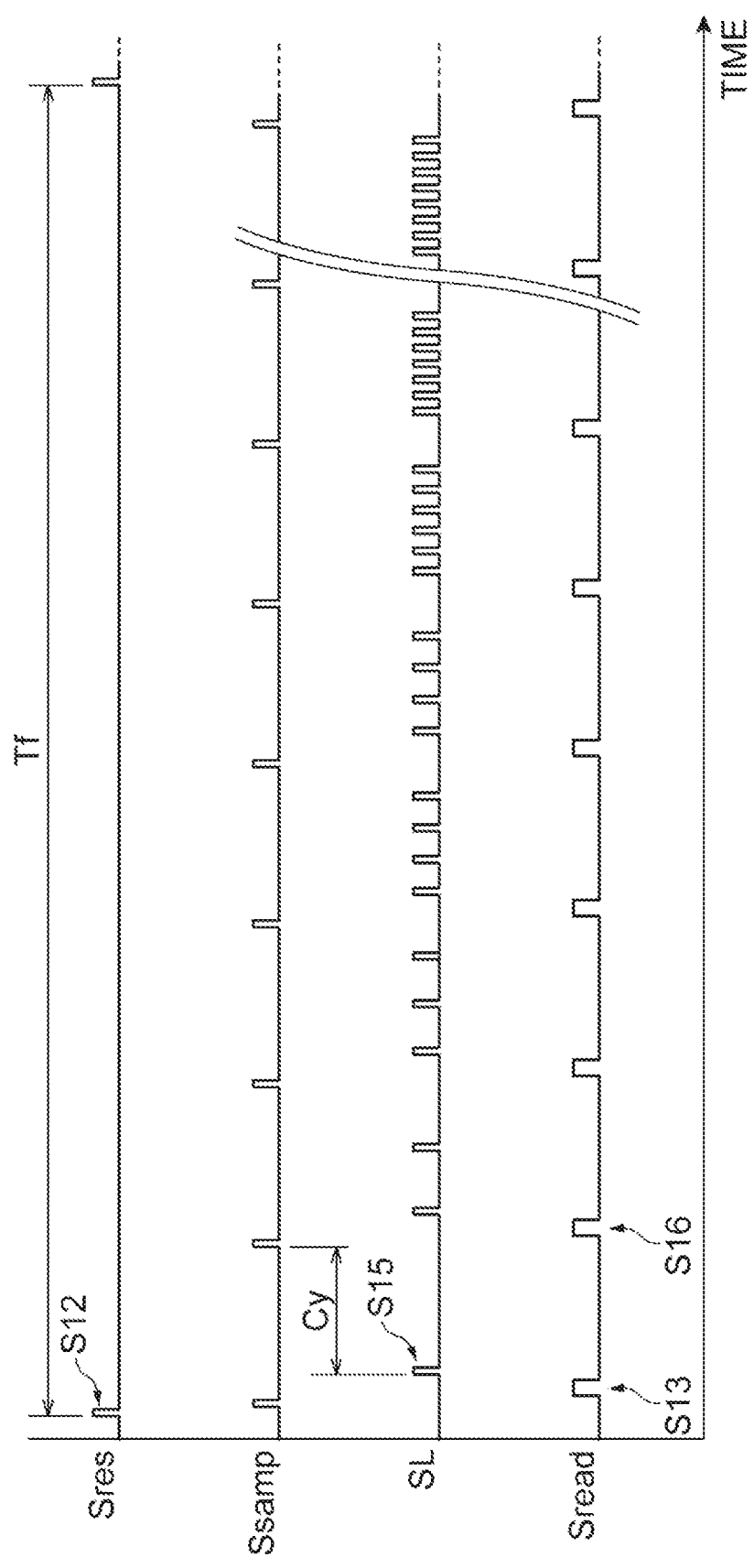
FIG. 11 is a timing chart of various signals used in the distance measuring device.

As illustrated in FIG. 10, the signal processing unit 16a may increase the number m of emission periods per charge transfer cycle Cy in three or more stages. Moreover, as illustrated in FIG. 11, the signal processing unit 16a may increase the number m of emission periods per charge transfer cycle Cy gradually from "1" to "M". In any case, the number m of emission periods per charge transfer cycle Cy monotonically increases within one frame period Tf.

Figure 12:
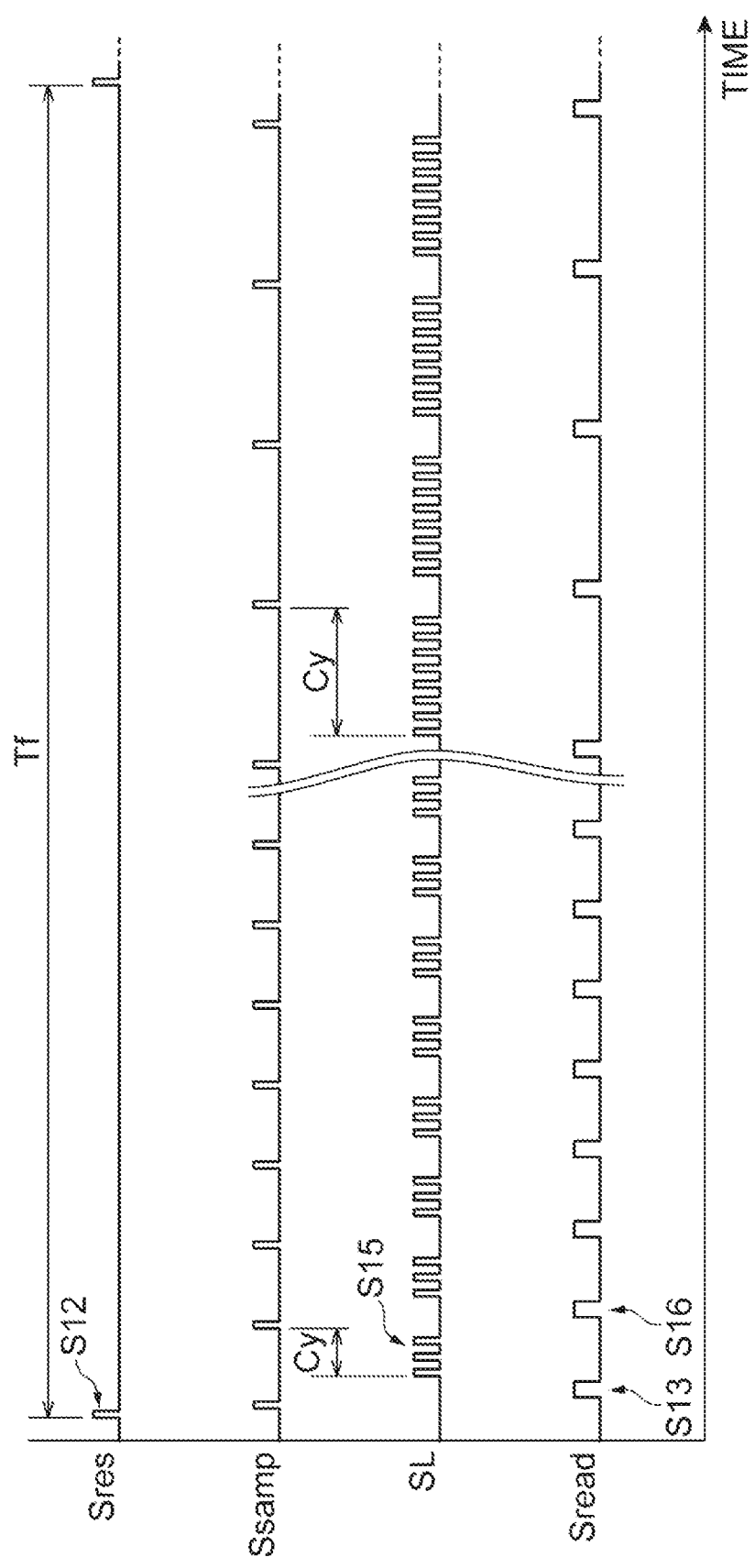
FIG. 12 is a timing chart of various signals used in the distance measuring device.

As illustrated in FIG. 12, the signal processing unit 16a may increase the number m of emission periods per charge transfer cycle Cy by increasing the length of the reading period and increasing the period of the charge transfer cycle Cy. That is, the signal processing unit 16a decreases the number m of emission periods per charge transfer cycle Cy by reducing the length of the reading period and reducing the period of the charge transfer cycle Cy, while increasing the number m of emission periods per charge transfer cycle Cy by increasing the period of the charge transfer cycle Cy.

The period of the charge transfer cycle Cy at the initial term of one frame period Tf is shorter than the period of the charge transfer cycle Cy in the latter term of one frame period Tf. That is, the period of the charge transfer cycle Cy in the latter term of one frame period Tf is longer than the period of the charge transfer cycle Cy at the initial term of one frame period Tf. The period of the charge transfer cycle Cy monotonically increases within one frame period Tf. The cycle of the emission period has not changed within one frame period Tf.

In the example illustrated in FIG. 12, the signal processing unit 16a increases the period of the charge transfer cycle Cy in two stages. For example, the number m of emission periods per charge transfer cycle Cy is "three", and the number of emission periods per charge transfer cycle Cy is "M" in the latter period of one frame period Tf. The number m of emission periods per charge transfer cycle Cy monotonically increases within one frame period Tf.

In the distance measuring device 10 of the present embodiment, the period of the charge transfer cycle Cy is shorter at the initial term of one frame period Tf than at the latter term of one frame period Tf, leading to the fewer number m of emission periods per charge transfer cycle Cy. Therefore, even when the intensity of the reflected light incident on the pixel unit P(j) of the sensor 18 is high (for example, when the object is located at a short distance or the reflectance of the object is high), saturation of accumulated signal charges tends not to occur at the initial term of one frame period Tf. Therefore, appropriate distance measurement is performed in the distance measuring device 10.

In the latter term of one frame period Tf, the period of the charge transfer cycle Cy is longer than the initial term of one frame period Tf, leading to the more number m of emission periods per charge transfer cycle Cy. Therefore, even when the intensity of the reflected light incident on the pixel unit P(j) of the sensor 18 is low (for example, when the object is located at a long distance or the reflectance of the object is low), shortage of accumulated signal charge is suppressed. Therefore, appropriate distance measurement is performed in the distance measuring device 10.

Figure 13:
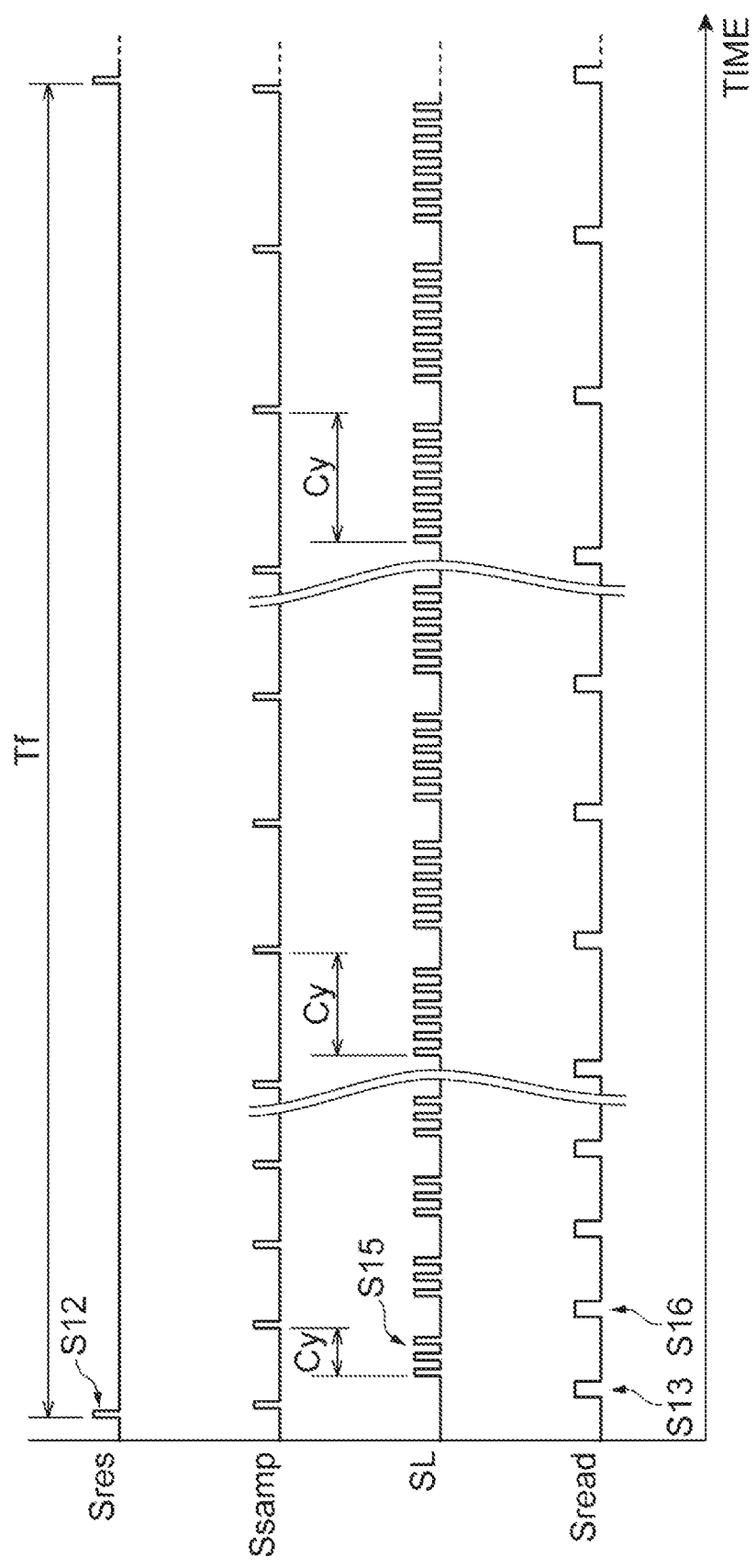
FIG. 13 is a timing chart of various signals used in the distance measuring device.
Figure 14:
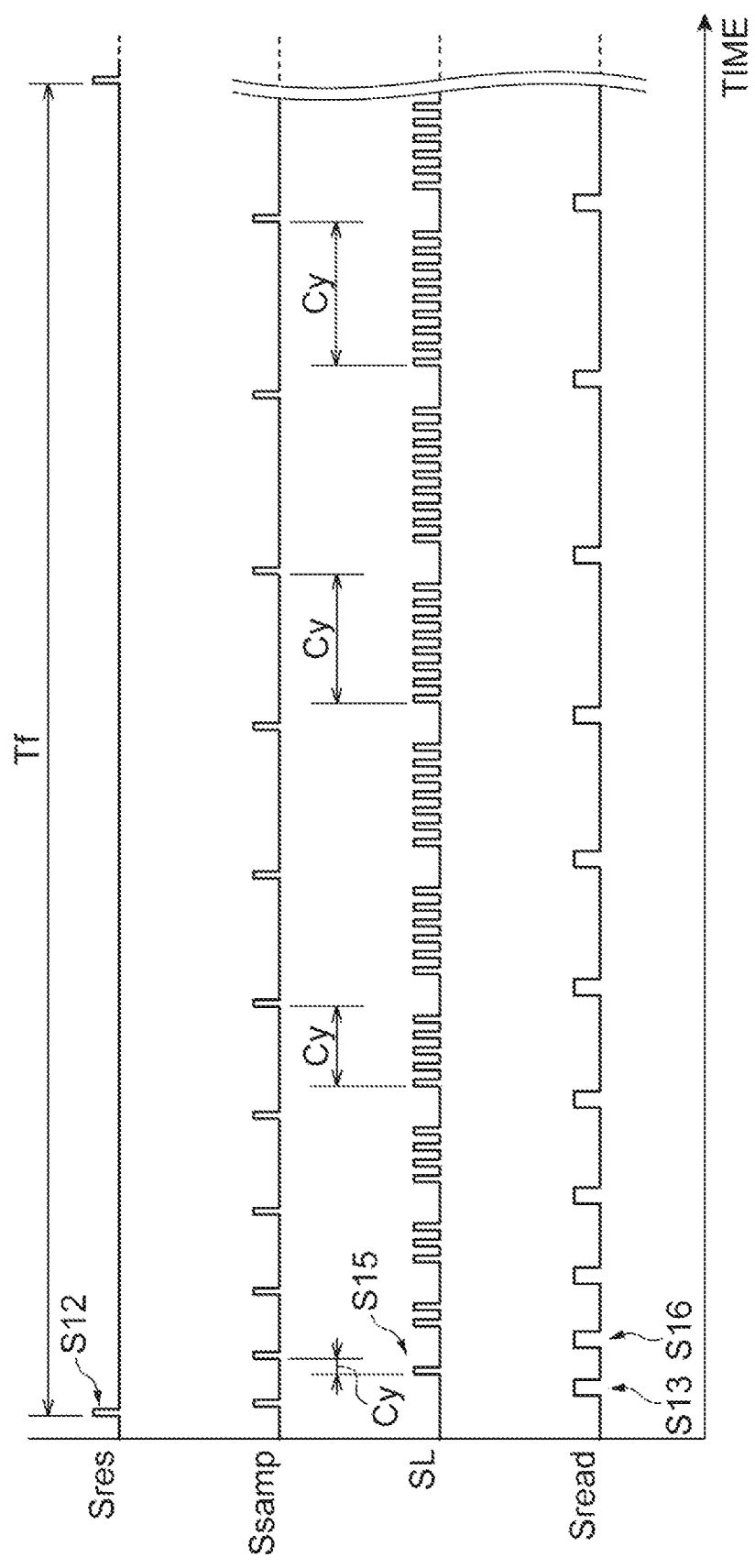
FIG. 14 is a timing chart of various signals used in the distance measuring device.

As illustrated in FIG. 13, the signal processing unit 16a may increase the period of the charge transfer cycle Cy in three or more stages. In this case, the number m of emission periods per charge transfer cycle Cy increases in three or more stages. Moreover, as illustrated in FIG. 14, the signal processing unit 16a may gradually increase the period of the charge transfer cycle Cy. In this case, for example, the number m of the emission periods per charge transfer cycle Cy gradually increases from "1" to "M". In any case, the number m of emission periods per charge transfer cycle Cy monotonically increases within one frame period Tf.

Figure 15:
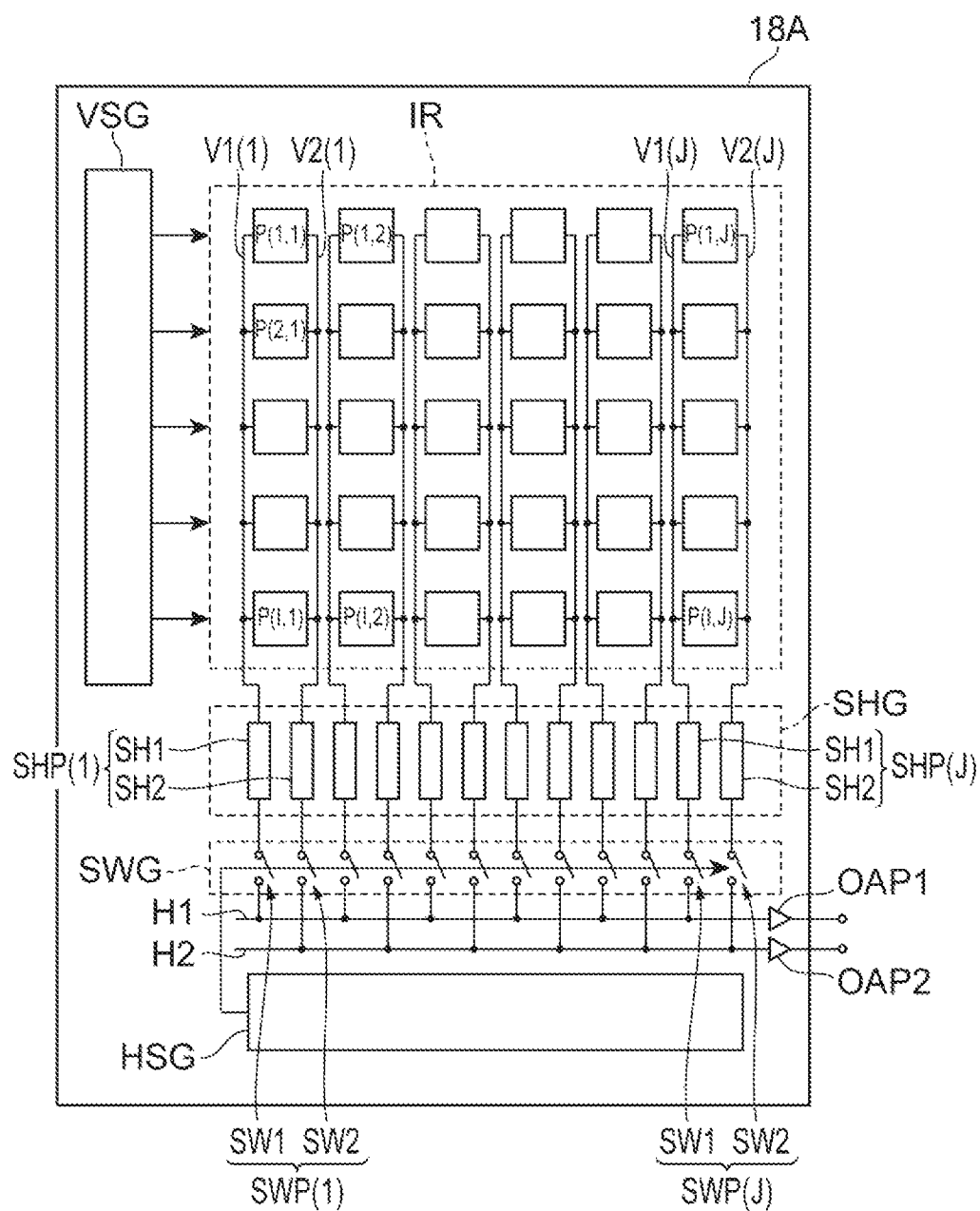
FIG. 15 is a diagram schematically illustrating an exemplary sensor according to another embodiment.
Figure 16:
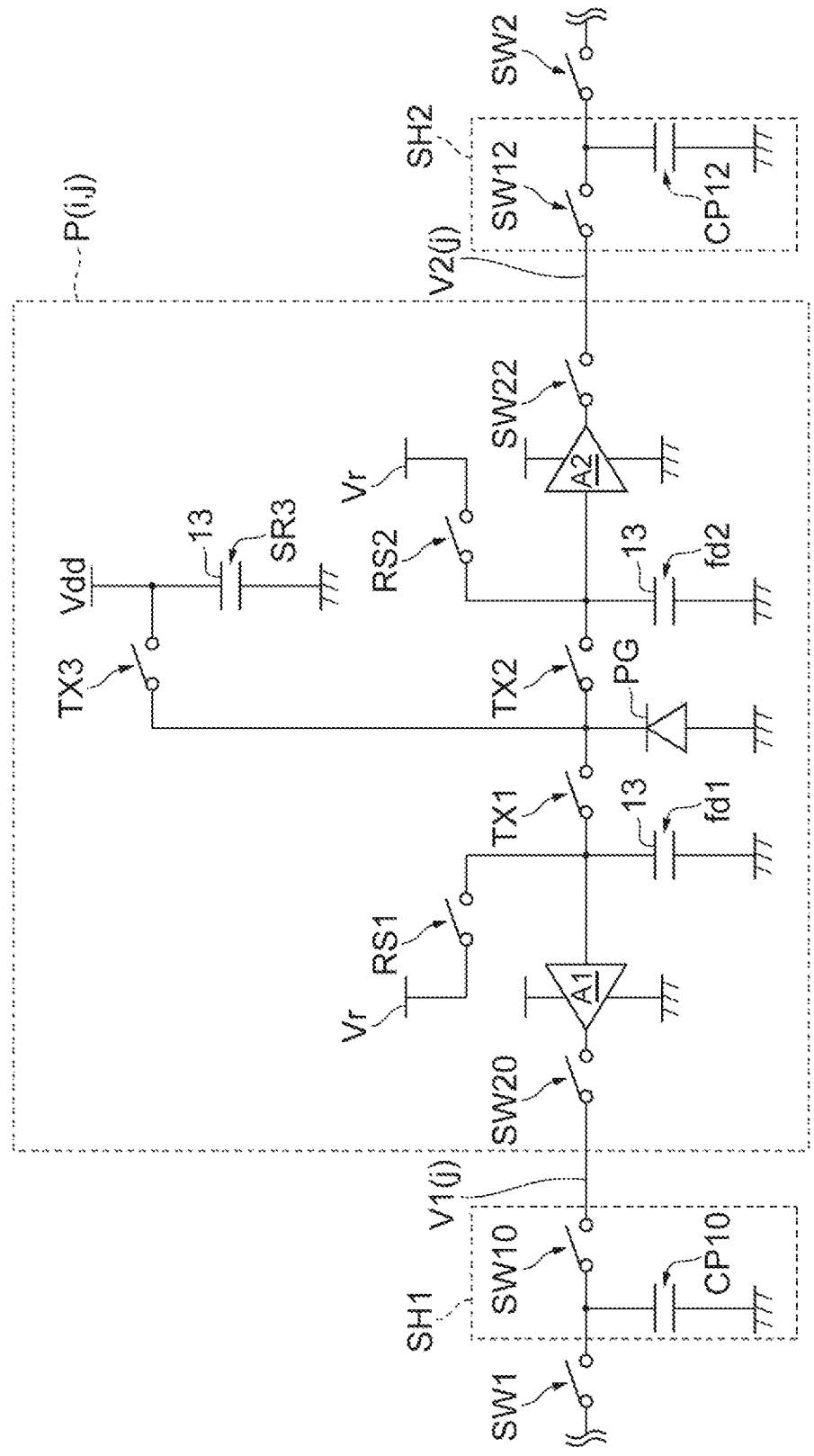
FIG. 16 is a circuit diagram of a pixel unit of a sensor unit according to the other embodiment and a sample-and-hold circuit corresponding to the pixel unit.

Next, another embodiment will be described with reference to FIGS. 15 and 16. FIG. 15 is a diagram illustrating an exemplary sensor according to the other embodiment. FIG. 16 is a circuit diagram of a pixel unit of a sensor unit according to the other embodiment and a corresponding sample-and-hold circuit for the pixel unit.

The distance measuring device 10 may include a sensor 18A illustrated in FIG. 15 instead of the sensor 18. The sensor 18A includes an imaging region IR having I×J pixel units P(i, j). Note that i is an integer of 1 to I, j is an integer of 1 to J, in which each of I and J is an integer of two or more. I×J pixel units P(i, j) are arranged in I rows and J columns. In the imaging region IR, two vertical signal lines V1(j) and V2(j) are provided for each of columns of the pixel unit.

As illustrated in FIG. 16, a switch SW20 is connected to the output of the charge-voltage conversion circuit A1 of the pixel unit P(i, j) of the sensor 18A. The switch SW20 is connected to the switch SW10 of the corresponding first sample-and-hold circuit SH1 via the corresponding vertical signal line V1(j). A switch SW22 is connected to the output of the charge-voltage conversion circuit A2 of the pixel unit P(i, j). The switch SW22 is connected to the switch SW12 of the corresponding second sample-and-hold circuit SH2 via the corresponding vertical signal line V2(j).

The sensor 18A further includes a vertical shift register group VSG. The vertical shift register group VSG includes a plurality of vertical shift registers arranged in the vertical direction. Each of the vertical shift registers includes a flip-flop, for example. A start signal is applied from the signal processing unit 16a to the vertical shift register provided at one end in an arrangement direction. A clock signal is applied from the signal processing unit 16a to all the vertical shift registers. Upon receiving the start signal and the clock signal, the vertical shift register group VSG sequentially applies row selection signals to the switches SW20 and SW22 of the plurality of pixel units P(i, j) in the order of rows.

With this configuration, the outputs of the charge-voltage conversion circuits A1 and A2 of the plurality of pixel units P(i, j) in each of columns are sequentially connected to the corresponding vertical signal lines V1(j) and V2(j), then, the output voltage of each of the plurality of pixel units P(i, j) is sequentially held in each of the corresponding sample-and-hold circuits SH1 and SH2, respectively, in the order of rows. When the output voltage of each of the plurality of pixel units P(i, j) in each of rows is respectively held in each of the corresponding sample-and-hold circuits SH1 and SH2, the voltage held in each of the sample-and-hold circuits SH1 and SH2 is sequentially coupled to each of signal lines H1 and H2 in the order of columns by a read pulse signal applied from the horizontal shift register group HSG. Then, by performing the calculation described with reference to FIG. 7 on each of the pixel units, the signal processing unit 16a can form a two-dimensional distance image.

Although the embodiments of the present invention have been described above, the present invention is not necessarily limited to the above-described embodiments, and various modifications can be made without departing from the spirit and scope of the present invention.

For example, although the embodiment illustrated in FIG. 15 includes the corresponding sample-and-hold circuits SH1 and S112 for each of the columns of the pixel unit, it is allowable to include the corresponding sample-and-hold circuits SH1 and SH2 for each of the pixel unit. The number of pixel units in the imaging region IR may be one.

The number m of emission periods per charge transfer cycle Cy is not limited to the values illustrated in FIG. 8 and FIGS. 10 to 14.

As described in Japanese Unexamined Patent Publication No. 2013-178121 and Japanese Unexamined Patent Publication No. 2013-206903 by the applicant of the present invention, each of the pixel units P(1) to P(J) may include two photosensitive regions (first photosensitive region and second photosensitive region). In this case, the first accumulating region accumulates the charge generated in the first photosensitive region, and the second accumulating region accumulates the charge generated in the second photosensitive region. The first transfer electrode is provided between the first photosensitive region and the first accumulating region. The second transfer electrode is provided between the second photosensitive region and the second accumulating region.

The photosensitive region, the accumulating region, and the transfer electrode, included in each of the pixel units P(1) to P(J) may be "one" as described in Japanese Unexamined Patent Publication No. 2013-178121 and Japanese Unexamined Patent Publication No. 2013-206903, described above. In this case, in the voltage signal applied to the transfer electrode, a phase shift is intermittently provided at a predetermined timing. For example, a phase shift of 180 degrees is provided at a timing of 180 degrees in the above-described voltage signal. The voltage signal applied to the transfer electrode is synchronized with the drive pulse signal SL at the timing of zero degrees and has a phase difference of 180 degrees at the timing of 180 degrees in the drive pulse signal SL. That is, the charge accumulated in the accumulating region is read at the timing of zero degrees and the timing of 180 degrees.

INDUSTRIAL APPLICABILITY

The present invention can be applied to a distance measuring device based on the TOF method.

REFERENCE SIGNS LIST 10 distance measuring device
12 light source unit
14 sensor unit
16 processing unit
16a signal processing unit
18 sensor
Cy charge transfer cycle
fd1 first accumulating region
fd2 second accumulating region
PG photogate electrode
RS1 first reset switch
RS2 second reset switch
T1 first transfer period
T2 second transfer period
Tf frame period
TX1 first transfer electrode
TX2 second transfer electrode
Vr reset potential

The invention claimed is:

1. A distance measuring device configured to obtain a distance to an object by a time-of-flight method, the device comprising:
a light source unit configured to emit modulated light;
a sensor unit including a photosensitive region configured to generate a charge in accordance with incident light, an accumulating region configured to accumulate the charge generated in the photosensitive region, a transfer electrode provided between the photosensitive region and the accumulating region, and a reset switch provided between the accumulating region and a reset potential, and;
a processing unit configured to calculate the distance by controlling emission timing of the modulated light and controlling the sensor unit,
wherein the processing unit
causes the light source unit to emit the modulated light in one or more emission periods in a plurality of charge transfer cycles within a frame period from connection of the accumulating region to the reset potential to next connection of the accumulating region to the reset potential by controlling the reset switch, and increases the number of emission periods per charge transfer cycle within the one frame period,
accumulates the charge generated in the photosensitive region into the accumulating region by controlling a voltage applied to the transfer electrode in one or more transfer periods synchronized with the one or more emission periods,
obtains, from the sensor unit, a plurality of read values corresponding to a charge amount accumulated in the accumulating region at an alternate point with the plurality of charge transfer cycles in each of a plurality of read cycles corresponding to each of the plurality of charge transfer cycles, and
calculates the distance based on the plurality of read values.

2. The distance measuring device according to claim 1, wherein the processing unit increases the number of emission periods per one charge transfer cycle by reducing a cycle of the emission period.

3. The distance measuring device according to claim 1, wherein the processing unit increases the number of emission periods per one charge transfer cycle by increasing a period of the charge transfer cycle.

4. The distance measuring device according to claim 1, wherein the processing unit increases, in stages, the number of emission periods per one charge transfer cycle.

5. The distance measuring device according to claim 1, wherein the processing unit gradually increases the number of emission periods per one charge transfer cycle from 1 to M, M being an integer.

6. The distance measuring device according to claim 1, wherein the sensor unit
includes a first accumulating region and a second accumulating region as the accumulating region, includes a first transfer electrode provided between the photosensitive region and the first accumulating region, and a second transfer electrode provided between the photosensitive region and the second accumulating region, as the transfer electrode, includes a first reset switch provided between the first accumulating region and the reset potential and a second reset switch provided between the second accumulating region and the reset potential, as the reset switch, and the processing unit accumulates the charge generated in the photosensitive region into the first accumulating region by controlling a voltage applied to the first transfer electrode in one or more first transfer periods synchronized with the one or more emission periods and accumulates the charge generated in the photosensitive region into the second accumulating region by controlling a voltage applied to the second transfer electrode in one or more second transfer periods phase-reversed with respect to the one or more first transfer periods, in a plurality of charge transfer cycles within the frame period from connection of the first accumulating region and the second accumulating region to the reset potential, to next connection of the first accumulating region and the second accumulating region to the reset potential, by controlling the first reset switch and the second reset switch, obtains, from the sensor unit, a plurality of first read values corresponding to a charge amount accumulated in the first accumulating region at an alternate point with the plurality of charge transfer cycles and a plurality of second read values corresponding to a charge amount accumulated in the second accumulating region at the point, in each of a plurality of read cycles corresponding to each of the plurality of charge transfer cycles, and calculates the distance based on the plurality of first read values and the plurality of second read values.

7. The distance measuring device according to claim 6, wherein the processing unit compares a sum of the first read value of the n-th read cycle and a difference value between the first read value of the n-th read cycle and the first read value of the (n−1)th read cycle, with a predetermined threshold, or compares a sum of the second read value of the n-th read cycle and a difference value between the second read value of the n-th read cycle and the second read value of the (n−1)th read cycle, with the predetermined threshold, and when any of the sums exceeds the predetermined threshold, the processing unit stops the read cycle of the (n+1)th and subsequent read cycles, where "n" indicates the order of the plurality of read cycles.

8. The distance measuring device according to claim 6, wherein the processing unit calculates a first estimated value using an approximate expression based on the plurality of first read values and calculates a second estimated value using an approximate expression based on the plurality of second read values, and calculates the distance based on the first estimated value and the second estimated value.

* * * * *